(12) United States Patent
Mochizuki

(10) Patent No.: US 11,089,191 B2
(45) Date of Patent: Aug. 10, 2021

(54) IMAGE SENSOR, RECORDING APPARATUS, AND RESET METHOD

(71) Applicant: Sony Semiconductor Solutions Corporation, Kanagawa (JP)

(72) Inventor: Futa Mochizuki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/048,455

(22) PCT Filed: Nov. 1, 2019

(86) PCT No.: PCT/JP2019/043153
§ 371 (c)(1),
(2) Date: Oct. 16, 2020

(87) PCT Pub. No.: WO2020/129435
PCT Pub. Date: Jun. 25, 2020

(65) Prior Publication Data
US 2021/0160413 A1 May 27, 2021

(30) Foreign Application Priority Data

Dec. 18, 2018 (JP) .............................. JP2018-236278
Oct. 15, 2019 (JP) .............................. JP2019-188432

(51) Int. Cl.
*H04N 5/225* (2006.01)
*H04N 5/365* (2011.01)
*H04N 5/353* (2011.01)

(52) U.S. Cl.
CPC ......... *H04N 5/22541* (2018.08); *H04N 5/353* (2013.01); *H04N 5/3655* (2013.01)

(58) Field of Classification Search
CPC .. H04N 5/22541; H04N 5/3655; H04N 5/353; H04N 3/155; H04N 3/355
See application file for complete search history.

(56) References Cited

U.S. PATENT DOCUMENTS 9,088,726 B2 * 7/2015 Mabuchi .............. H04N 5/2353
9,521,337 B1 * 12/2016 Shen .................... H04N 5/3355
(Continued)

FOREIGN PATENT DOCUMENTS

JP 2017-535999 A 11/2017
WO WO-2019176250 A1 * 9/2019 ............ H04N 5/232

*Primary Examiner* — Chiawei Chen
(74) *Attorney, Agent, or Firm* — Michael Best & Friedrich LLP

(57) ABSTRACT

An image sensor with improved reference level accuracy for event detection and event detection precision is disclosed. In one example, an image sensor includes a photoreception section, an event detection section, a retention section, a readout section, and a reset section. The photoreception section acquires an electric signal proportional to an amount of light received as a photoreception signal. The event detection section detects a change in the amount of light received as an event by finding a difference between a reference level, and a current photoreception signal level. The retention section retains a detection signal that is based upon detection of the event. The readout section reads out the detection signal as an event signal. The reset section resets the reference level to the readout of the event signal by the readout section.

13 Claims, 24 Drawing Sheets

(56) References Cited

U.S. PATENT DOCUMENTS

| | | | |
|---|---|---|---|
| 2010/0026838 A1* | 2/2010 | Belenky | H04N 5/35536 |
| | | | 348/229.1 |
| 2010/0182468 A1* | 7/2010 | Posch | H04N 5/335 |
| | | | 348/294 |
| 2011/0242378 A1* | 10/2011 | Mabuchi | H04N 5/353 |
| | | | 348/296 |
| 2012/0026370 A1* | 2/2012 | Oike | H04N 5/37457 |
| | | | 348/298 |
| 2014/0049675 A1* | 2/2014 | Takatsuka | H04N 5/363 |
| | | | 348/303 |
| 2017/0302866 A1* | 10/2017 | Fu | H04N 9/045 |
| 2019/0020805 A1* | 1/2019 | Trieu | G06T 5/50 |
| 2019/0273884 A1* | 9/2019 | Finateu | H04N 5/3745 |
| 2021/0006742 A1* | 1/2021 | Oh | H04N 5/37452 |

\* cited by examiner 1 (IMAGE SENSOR)

F I G. 8
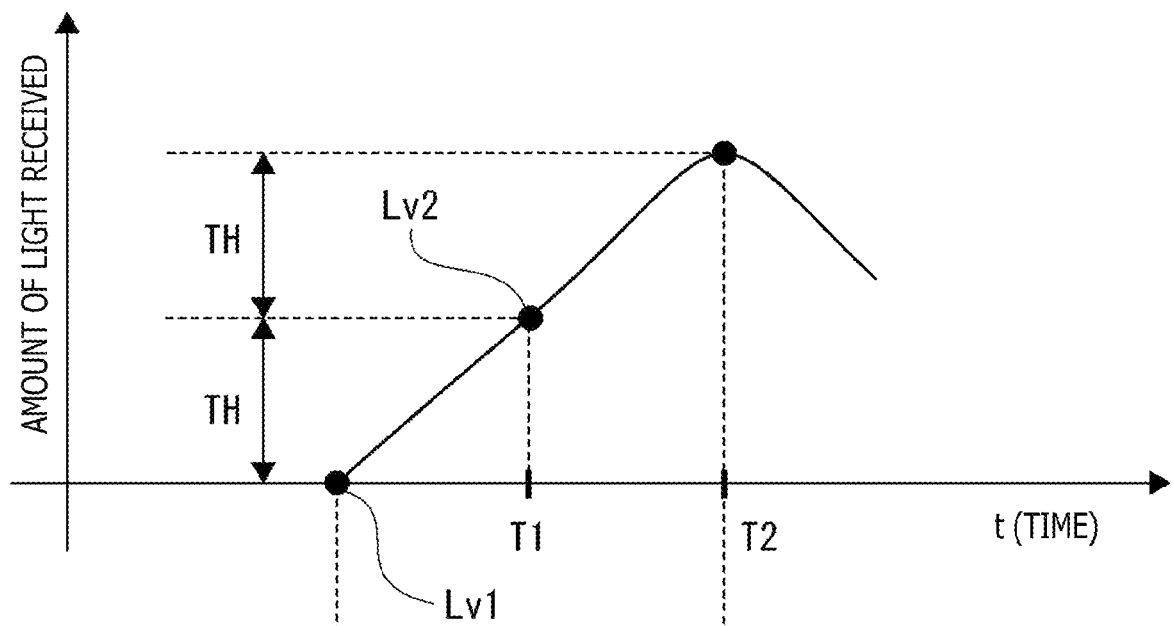
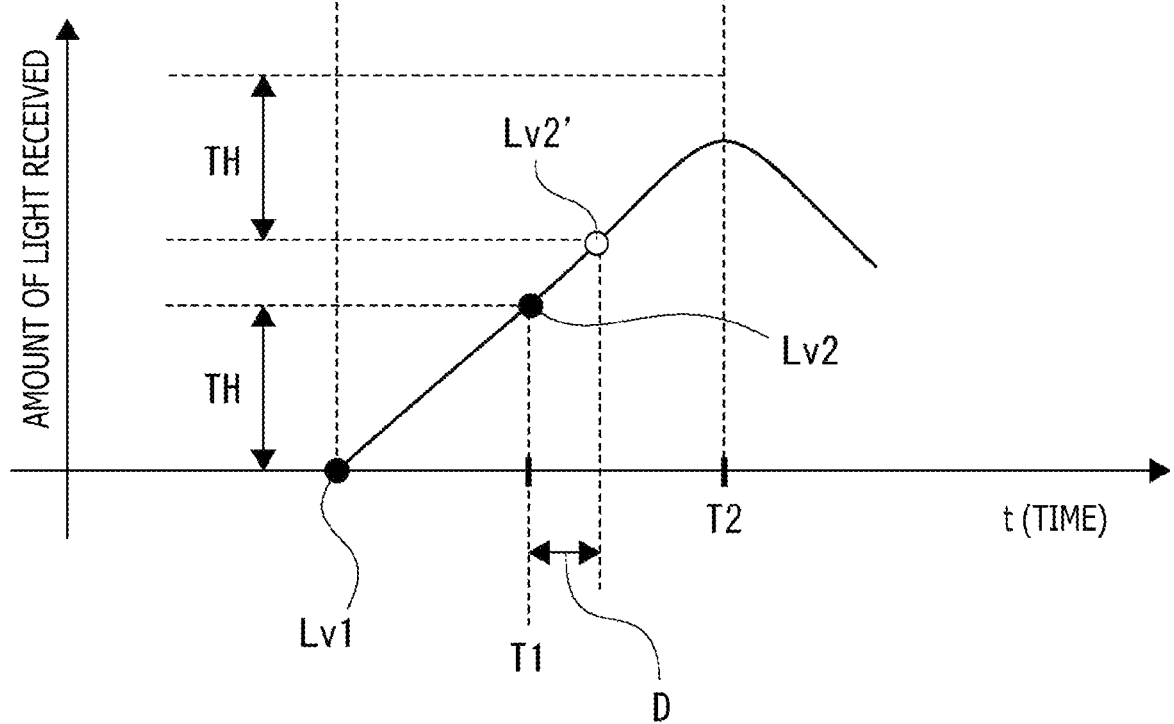

IMAGE SENSOR, RECORDING APPARATUS, AND RESET METHOD

TECHNICAL FIELD

The present technology relates to an asynchronous image sensor for detecting a change in amount of light received as an event and selectively reading out a signal from a pixel where the event is detected, a recording apparatus having the image sensor, and a reset method of resetting event detection in the image sensor.

BACKGROUND ART

Synchronous image sensors that acquire image data (frames) in synchronism with a vertical synchronizing signal or other synchronizing signal are pervasive. In such synchronous image sensors, image data acquisition intervals are limited to a period (e.g., $1/60^{th}$ of a second) of the synchronizing signal. This makes it difficult to deal with situations requiring faster processing in sectors related to traffic, robotics, or the like. Accordingly, there has been proposed an asynchronous image sensor equipped with a detection circuit for detecting, in real time, a change in amount of light received by a pixel as an event for each pixel (for example, refer to PTL 1). For example, as is known as a DVS (Dynamic Vision Sensor), asynchronous image sensors of this kind detect the change in amount of light received as an event and selectively read out a signal from a pixel where the event is detected, thus ensuring faster acquisition of image data. Also, signals are read out only from the pixels where events are detected, thus contributing to reduced power consumption.

CITATION LIST

Patent Literature

[PTL 1]
   JP-T-2017-535999

SUMMARY

Technical Problems

Here, event detection is carried out by finding a difference between a past photoreception signal level, i.e., a reference level, and a current photoreception signal level. In the case of detection of an event, information to that effect is notified to an arbiter, thus causing an event detection signal of the corresponding pixel to be read out. Also, in the case of detection of an event, the reference level is updated (reset) to the current photoreception signal level, thus allowing for detection of a new event.

Here, a possible option would be to reset the reference level in response to the readout of an event signal.

However, a considerable amount of time is required from receipt of a notice regarding event detection by the arbiter to issuance of an instruction to read out a signal of the corresponding pixel. Therefore, a delay occurs in resetting the reference level if the reference level is reset in response to the readout as described above. That is, there is a fear that the reference level may not be swiftly updated to the photoreception signal level at the time of event detection, thus resulting in degraded accuracy of the reference level. In the case where the reference level degrades in accuracy, there is a fear that precision for detecting events may degrade due, for example, to an omission of event detection.

The present technology has been devised in light of the foregoing circumstances, and it is an object of the present technology to ensure improved accuracy of the reference level for event detection and achieve improved precision for event detection.

Solution to Problems

An image sensor according to the present technology includes a photoreception section, an event detection section, a retention section, a readout section, and a reset section. The photoreception section acquires an electric signal proportional to an amount of light received as a photoreception signal. The event detection section detects a change in the amount of light received as an event by finding a difference between a past photoreception signal level, i.e., a reference level, and a current photoreception signal level. The retention section receives input of a detection signal indicating the detection of the event from the event detection section and retains the detection signal. The readout section reads out the detection signal retained by the retention section as an event signal. The reset section resets the reference level to the current photoreception signal level of the photoreception section after the detection of the event by the event detection section and before the readout of the event signal by the readout section.

This makes it possible to swiftly reset (update) the reference level used for event detection to the current photoreception signal level in response to event detection.

In the image sensor according to the present technology described above, a possible option would be for the reset section to reset the reference level on the basis of the detection signal output from the event detection section.

This makes it possible to reset the reference level after the detection of an event by the event detection section and before the readout of an event signal by the readout section.

In the image sensor according to the present technology described above, a possible option would be for the reset section to reset the reference level on the basis of a signal obtained by delaying the detection signal.

This makes it possible to delay a timing when the reference level is reset (i.e., timing when the detection of a new event is initiated) until the level of the detection signal retained by the retention section reaches or surpasses a certain level.

In the image sensor according to the present technology described above, a possible option would be for the reset section to reset the reference level on the basis of an output signal of the retention section.

As a result, the reference level is reset in response to the fact that the level of the detection signal retained by the retention section reaches or surpasses a certain level.

In the image sensor according to the present technology described above, a possible option would be to provide an interruption section that interrupts the output of a detection signal from the event detection section to the retention section in accordance with the level of the detection signal retained by the retention section.

This makes it possible to perform control that allows for proper output of an event signal including halting the output of a detection signal from the event detection section to the retention section in response to the fact that the level of the detection signal retained by the retention section reaches or surpasses a certain level and canceling the halting of the output of the detection signal to the retention section in response to the fact that the level of the detection signal retained by the retention section falls below a certain level.

In the image sensor according to the present technology described above, a possible option would be for the interruption section to halt the output in response to the fact that the level of the detection signal retained by the retention section reaches or surpasses a certain level.

This makes it possible to prevent a new event detection signal that occurs before readout from being merged into a detection signal of an immediately previous event.

In the image sensor according to the present technology described above, a possible option would be for the interruption section to cancel the halting of the output in response to the fact that the level of the detection signal retained by the retention section falls below a certain level.

This permits input of the detection signal to the retention section in response to the fact that the level of the detection signal retained by the retention section falls below a certain level as a result of readout of a signal from the retention section, thus allowing for the retention section to retain a new event detection signal.

In the image sensor according to the present technology described above, a possible option would be for the interruption section to include a switch turned ON and OFF by an output signal of the retention section that is inserted in an output line of the detection signal from the event detection section to the retention section.

This ensures that the interruption section needs only a switch that is turned ON and OFF by an output signal of the retention signal as its component.

In the image sensor according to the present technology described above, a possible option would be for the retention section to count and retain the number of times the detection signal is acquired by the event detection section as the number of event occurrences and for the readout section to read out a retained count value as the event signal.

This makes it possible to output an event signal that indicates the number of events that take place until readout even in the case of a long wait time from an event occurrence to readout.

In the image sensor according to the present technology described above, a possible option would be to provide the plurality of photoreception sections, to provide the event detection section for each of the photoreception sections, and to cause the reset section to reset the reference signal level of the plurality of event detection sections with a common reset signal.

This contributes to a reduced number of reset sections to be provided in realizing a reset of each of the event detection sections.

In the image sensor according to the present technology described above, a possible option would be that the four photoreception sections include a plurality of pixels arranged in a Bayer pattern and that the reset section is provided for each of the pixels.

This makes it possible to reduce, in the case where a pixel configuration is adopted that permits color image capture, the circuit scale as compared to the case where a reset section is provided for each event detection section while at the same time using an appropriate event detection unit as a pixel unit.

Also, a recording apparatus according to the present technology includes an image sensor and a recording section. The image sensor includes a photoreception section, an event detection section, a retention section, a readout section, and a reset section. The photoreception section acquires an electric signal proportional to an amount of light received as a photoreception signal. The event detection section detects a change in the amount of light received as an event by finding a difference between a past photoreception signal level, i.e., a reference level, and a current photoreception signal level. The retention section receives input of a detection signal indicating the detection of the event from the event detection section and retains the detection signal. The readout section reads out the detection signal retained by the retention section as an event signal. The reset section resets the reference level to the current photoreception signal level of the photoreception section after the detection of the event by the event detection section and before the readout of the event signal by the readout section. The recording section records the event signal read out by the readout section.

Such a recording apparatus also provides a similar advantageous effect to the image sensor according to the present technology described above.

Also, a reset method according to the present technology detects a change in an amount of light received as an event by finding a difference between a past photoreception signal level, i.e., a reference level, of a photoreception section that acquires an electric signal proportional to an amount of light received as a photoreception signal, and a current photoreception signal level, receives input of a detection signal indicating the detection of the event and retains the detection signal, reads out the retained detection signal as an event signal, and resets the reference level to the current photoreception signal level of the photoreception section after the detection of the event and before the readout of the event signal.

Such a reset method also provides a similar advantageous effect to the image sensor according to the present technology described above.

BRIEF DESCRIPTION OF DRAWINGS

FIG. 8 is a diagram for describing significance of swiftly resetting a reference level in response to event detection.

DESCRIPTION OF EMBODIMENTS

A description will be given below of embodiments according to the present technology with reference to attached drawings in the following order.
<1. First Embodiment>
[1-1. Configuration of the imaging apparatus]
[1-2. Reset section of the first embodiment]
[1-3. Modification examples associated with detection signal retention]
<2. Second Embodiment>
<3. Third Embodiment>
<4. Fourth Embodiment>
[4-1. Outline of the scanning scheme]
[4-2. Counting scheme]
[4-3. Modification examples related to the counting scheme]
<5. Modification Examples Related to Pixel Configuration>
<6. Other Modification Examples>
<7. Conclusion of Embodiments>
<8. Present Technology>

1. First Embodiment

1-1. Configuration of the Imaging Apparatus

Figure 1:
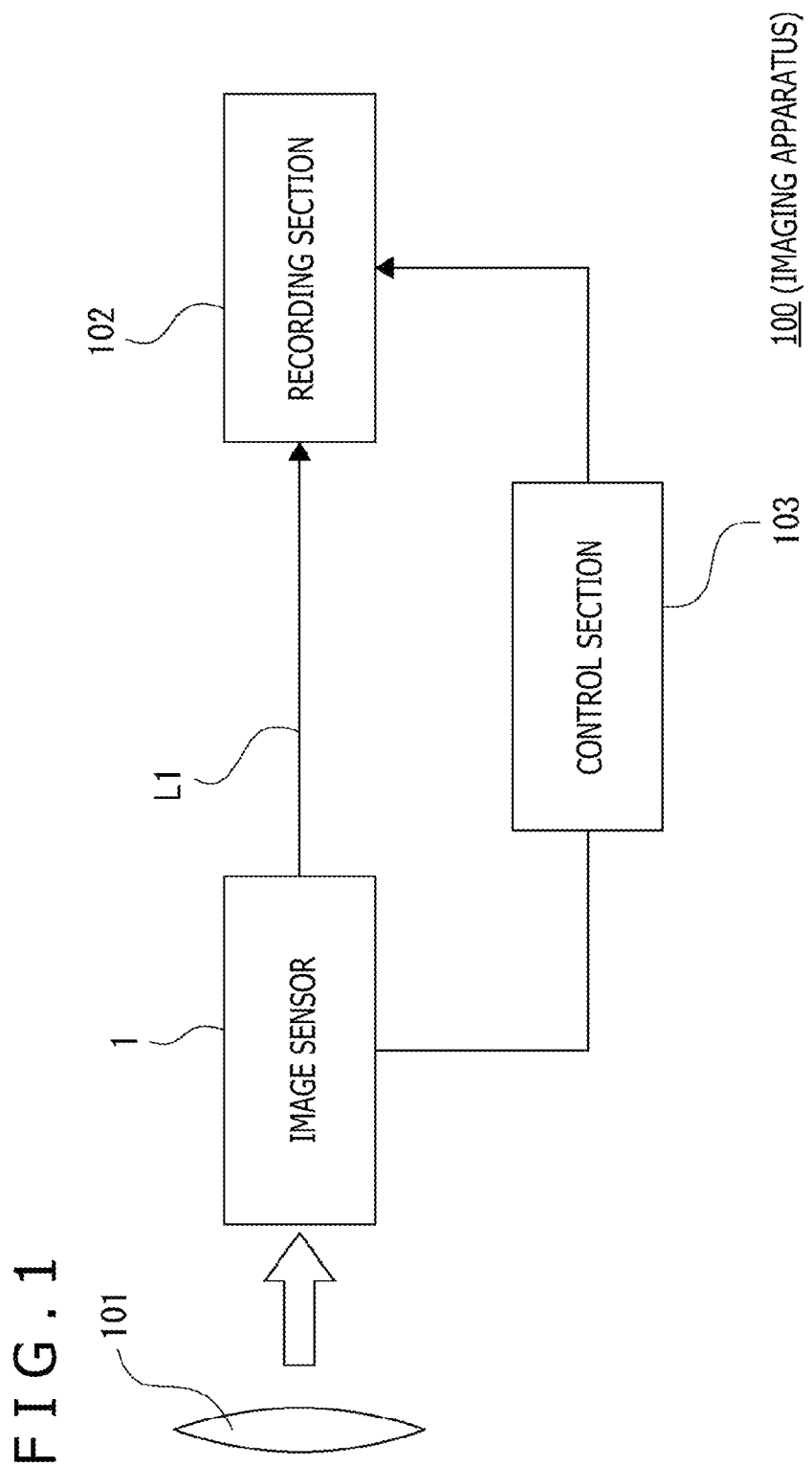
FIG. 1 is a diagram illustrating a configuration example of an imaging apparatus having an image sensor as an embodiment according to the present technology.

FIG. 1 is a diagram illustrating a configuration example of an imaging apparatus 100 having an image sensor 1 as an embodiment according to the present technology.

The imaging apparatus 100 includes not only the image sensor 1 but also an imaging lens 101, a recording section 102, and a control section 103. Among possible examples of the imaging apparatus 100 include a camera mounted on an industrial robot, a vehicle-mounted camera, and the like.

The imaging lens 101 concentrates incident light and guides it to the image sensor 1. The image sensor 1 acquires an electric signal proportional to an amount of light received as a photoreception signal through photoelectric conversion of incident light and detects a change in amount of light received as an event on the basis of the photoreception signal. Further, the image sensor 1 outputs event signals indicating event detection results (event signals Evnp and Evnm described later) to the recording section 102 via a signal line L1.

It should be noted that a specific internal structure of the image sensor 1 will be described later.

The recording section 102 records event signals output from the image sensor 1.

The control section 103 includes a microcomputer including, for example, a CPU (Central Processing Unit), a ROM (Read Only Memory), a RAM (Random Access Memory), and the like, controlling the operation of the imaging apparatus 100 as the CPU performs processes in accordance with a program. In particular, the control section 103 controls the image sensor 1 to perform an output operation of the event signal described above and controls the recording section 102 to perform a recording operation of the event signal.

Figure 2:
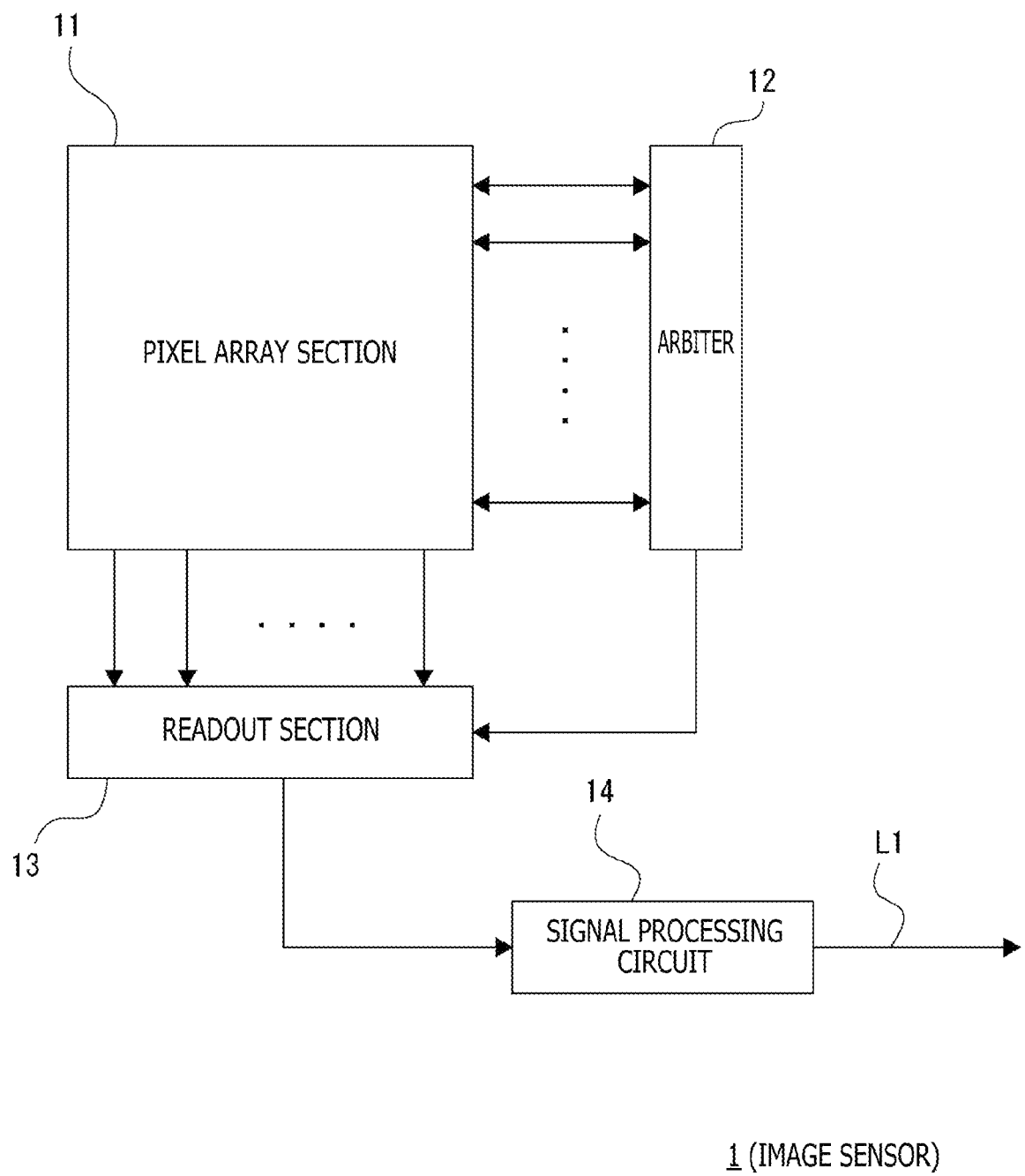
FIG. 2 is a diagram illustrating an internal configuration example of an image sensor as an embodiment.

FIG. 2 is a diagram illustrating an internal configuration example of the image sensor 1.

As illustrated, the image sensor 1 includes a pixel array section 11, an arbiter 12, a readout section 12, and a signal processing circuit 14.

The pixel array section 11 has a plurality of pixels (pixels 15 described later) arranged in a two-dimensional grid pattern. Hereinafter, a set of pixels arranged horizontally in the pixel array section 11 will be referred to as "rows," and a set of pixels arranged vertically relative to the rows will be referred to as "columns."

In the present example, each of the pixels detects the presence or absence of an event on the basis of whether or not a change in amount of light received surpasses a given threshold, and outputs a request to the arbiter 12 when an event occurs.

The readout section 13 reads out event signals sent from the pixels of the pixel array section 11 to the signal processing circuit 14.

The arbiter 12 arbitrates requests from the pixels of the pixel array section 11 and controls readout operation of the readout section 13 on the basis of an arbitration result. Specifically, the arbiter 12 performs control such that an event signal of a pixel where an event has occurred is read out.

Here, in the present example, the event signal is a signal quantized (binarized) by a quantizer 17b which will be described later.

The signal processing circuit 14 performs given signal processing on the event signal that has been read out, outputting the processed signal to the recording section 102 via a signal line L1.

Figure 3:
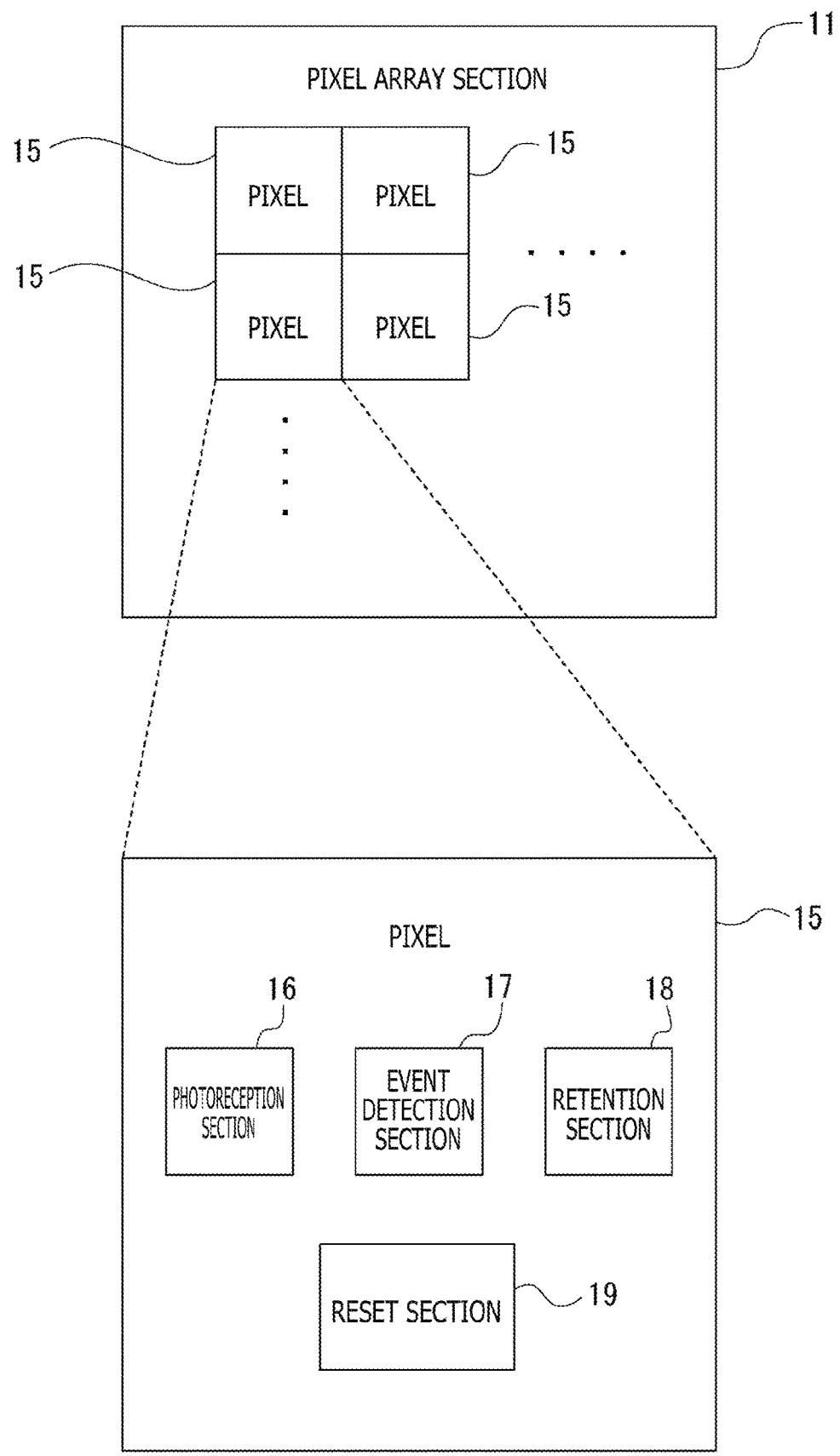
FIG. 3 is a diagram illustrating a configuration example of a pixel array section included in the image sensor as an embodiment.

FIG. 3 is a diagram illustrating a configuration example of the pixel array section 11.

As illustrated, the pixel array section 11 has the plurality of pixels 15 arranged in the row and column directions. Each of the pixels 15 includes a photoreception section 16, an event detection section 17, a retention section 18, and a reset section 19.

The photoreception section 16 acquires an electric signal proportional to an amount of light received as a photoreception signal.

The event detection section 17 detects the change in amount of light received as an event by finding the difference between a past photoreception signal level, i.e., a reference level Lref, and a current photoreception signal level. Specifically, the event detection section 17 detects the presence or absence of an event on the basis of whether or not a differential signal level (absolute value) indicating the difference between the reference level Lref and the current photoreception signal level is equal to or greater than a given threshold TH.

The event detection section 17 of the present example can distinguishably detect an event that causes the amount of light received to increase, i.e., an event that produces a positive difference from the reference level Lref (hereinafter denoted as an "ON event") and an event that causes the amount of light received to decrease, i.e., an event that produces a negative difference from the reference level Lref (hereinafter denoted as an "OFF event").

The retention section 18 receives input of a detection signal indicating an event detection result (hereinafter denoted as a "detection signal Sd" for purpose of description) from the event detection section 17 and retains the signal.

In the present example, the retention section 18 can retain the detection signal Sd indicating a detection result of the above ON event and the detection signal Sd indicating a detection result of the above OFF event.

The reset section 19 resets the reference level Lref used by the event detection section 17 for event detection to the current reception signal level of the photoreception section 16. In particular, the reset section 19 of the preset example resets the reference level Lref after event detection by the event detection section 17 and before the readout of an event signal by the readout section 13.

The resetting of the reference level Lref to the current photoreception signal level allows for detection of a new event on the basis of the change in the photoreception signal level from that moment. That is, the resetting of the reference level Lref functions as a process of controlling the event detection section 17 to be able to detect a new event.

Figure 4:
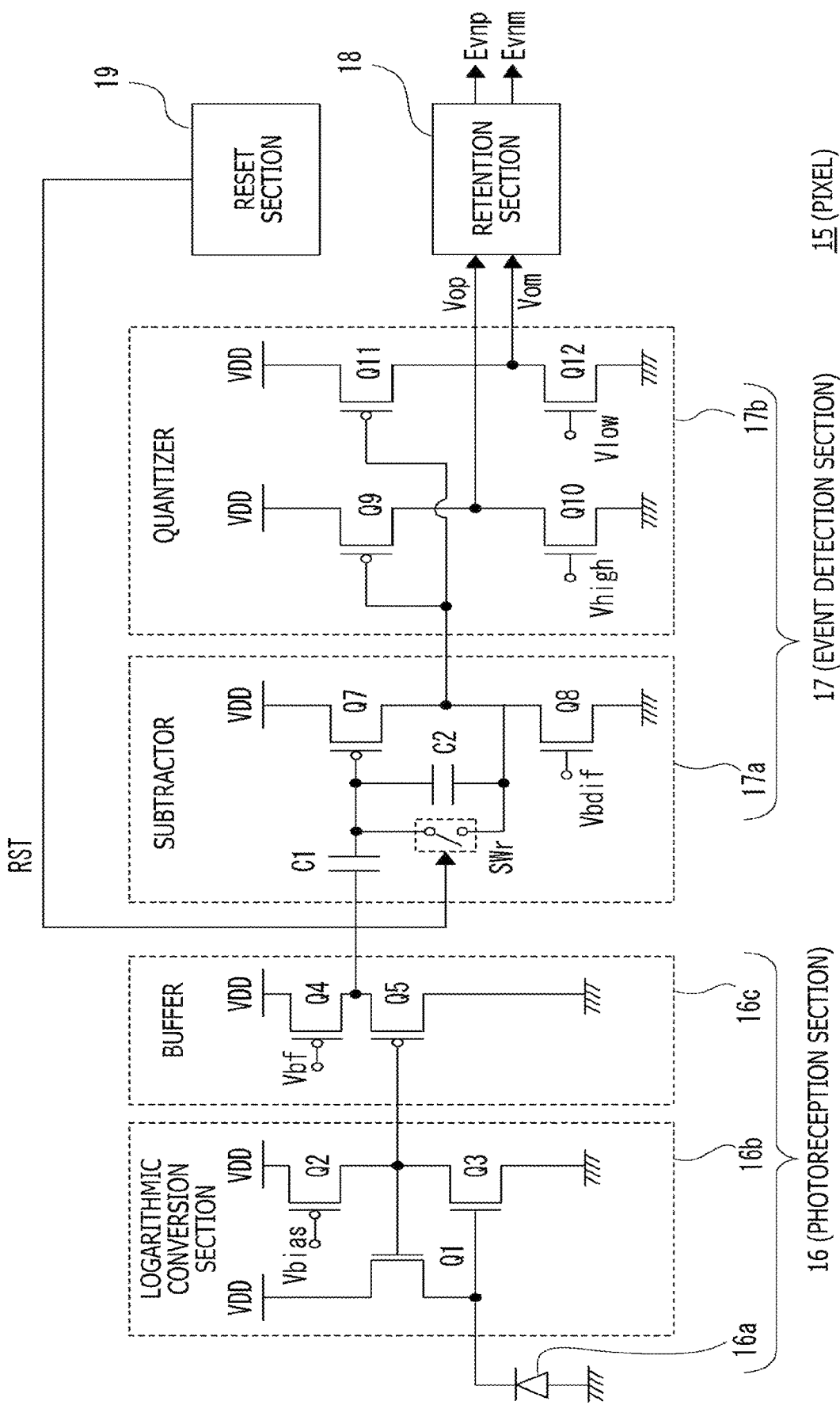
FIG. 4 is a diagram for describing circuit configuration examples of a photoreception section and an event detection section included in the image sensor as an embodiment.

FIG. 4 is a diagram for describing specific circuit configuration examples of the photoreception section 16 and the event detection section 17 in the pixel 15.

As illustrated, the photoreception section 16 includes a photoreception element 16a, a logarithmic conversion section 16b, and a buffer 16c whereas the event detection section 17 includes a subtractor 17a and the quantizer 17b.

In the photoreception section 16, the photoreception element 16a is a photoelectric conversion element that generates electric charge through photoelectric conversion of incident light. In the present example, a photodiode is used as the photoreception section 16.

The logarithmic conversion section 16b converts a photocurrent (current proportional to the amount of light received) acquired by the photoreception section 16 as a photodiode into a voltage signal equal to a logarithm of the photocurrent.

The buffer 16c corrects the voltage signal input from the logarithmic conversion section 16b, outputting the corrected signal to the subtractor 17a of the event detection section 17.

As illustrated, the logarithmic conversion section 16b includes a transistor Q1, a transistor Q2, and a transistor Q3. In the present example, a MOSFET (MOS: Metal-Oxide-Semiconductor, FET: field-effect transistor) is used as each of transistors up to a transistor Q12 including these transistors Q1, Q2, and Q3.

In the logarithmic conversion section 16b, the transistors Q1 and Q2 are N-type transistors whereas the transistor Q3 is a P-type transistor.

The transistor Q1 has its source connected to the photoreception element 16a (connected to a cathode of the photodiode) and its drain connected to a power supply terminal. It should be noted that "VDD" in the figure refers to a source voltage.

The transistors Q2 and Q3 are connected in series between the power supply terminal and a grounding terminal. Also, a connection point between the transistors Q2 and Q3 is connected to a gate of the transistor Q1 and an input terminal of the buffer 16c (gate of the transistor Q5 described later). Also, a given bias voltage Vbias is applied to a gate of the transistor Q2.

The transistors Q1 and Q3 have their drains connected to the power supply side, and such circuits are called source followers. The two source followers connected in a loop form convert a photocurrent from the photoreception element 16a into a voltage signal equal to the logarithm of the photocurrent. Also, the transistor Q2 supplies a constant current to the transistor Q3.

The buffer 16c includes the transistors Q4 and Q5, both P-type transistors, that are connected in series between the power supply terminal and the grounding terminal.

A connection point between the transistors Q4 and Q5 is an output terminal of the buffer 16c, and the corrected voltage signal is output from the output terminal to the subtractor 17a of the event detection section 17.

In the event detection section 17, the subtractor 17a reduces the level of the voltage signal supplied from the buffer 16c in accordance with a reset signal RST output from the reset section 19. This subtractor 17a outputs the reduced voltage signal to the quantizer 17b.

The quantizer 17b quantizes the voltage signal supplied from the subtractor 17a into a digital signal, outputting the digital signal to the retention section 18 as a detection signal (correspond to the detection signal Sd described earlier). In the present example, the quantizer 17b outputs the detection signal Sd indicating an ON event detection result (output voltage Vop in the figure) and the detection signal Sd indicating an OFF event detection result (output voltage Vom in the figure) on the basis of the voltage signal supplied from the subtractor 17a.

The subtractor 17a includes a capacitor C1, a capacitor C2, the transistor Q7, the transistor Q8, and a reset switch SWr. The transistor Q7 is a P-type transistor whereas the transistor Q8 is an N-type transistor.

The transistors Q7 and Q8 are connected in series between the power supply terminal and the grounding terminal, forming an inverter. Specifically, the transistor Q7 has its source connected to the power supply terminal and its drain connected to the drain of the transistor Q8 whereas the transistor Q8 has its source connected to the grounding terminal. It should be noted that a voltage Vbdif is applied to the gate of the transistor Q8.

The capacitor C1 has its one end connected to the output terminal of the buffer 16c and its other end connected to a gate of the transistor Q7 (input terminal of the inverter). The capacitor C2 has its one end connected to the other end of the capacitor C1 and its other end connected to a connection point between the transistors Q7 and Q8.

The reset switch SWr has its one end connected to the connection point between the capacitors C1 and C2 and its other end connected to a connection point between the connection point between the transistors Q7 and Q8 and the capacitor C2, and the reset switch SWr is connected in parallel with the capacitor C2. The reset switch SWr is turned ON and OFF by the reset signal RST from the reset section 9.

The inverter formed by the transistors Q7 and Q8 inverts the voltage signal input via the capacitor C1, outputting the inverted voltage signal to the quantizer 17b.

Here, in the subtractor 17a, a potential that occurs on the buffer-16c side of the capacitor C1 at a certain moment is denoted as a potential Vinit. Then, we assume that, at this time, the reset switch SWr is turned ON. In the case where the reset switch SWr is ON, the side of the capacitor C1 opposite to the buffer 16c is a virtual grounding terminal. We assume that the potential of this virtual grounding terminal is zero for reasons of convenience. At this time, charge CHinit accumulated in the capacitor C1 can be expressed by the following [formula 1] where Cp1 is the capacitance of the capacitor C1.

$$CHinit = Cp1 \times Vinit \qquad [\text{Formula 1}]$$

Also, when the reset switch SWr is ON, both ends of the capacitor C2 are shorted. Accordingly, there is no accumulated charge.

Next, we assume that the reset switch SWr is turned OFF. If the amount of light received changes, the potential of the buffer-16c side of the capacitor C1 changes from the above Vinit. Letting the changed potential in question be denoted as Vafter, charge CHafter accumulated in the capacitor C1 is expressed by the following [formula 2].

$$CHafter = Cp1 \times Vafter \qquad [\text{Formula 2}]$$

Meanwhile, charge CH2 accumulated in the capacitor C2 is expressed by the following [formula 3] where Cp2 is the capacitance of the capacitor C2 and Vout is the output voltage of the subtractor 17.

$$CH2 = -Cp2 \times Vout \qquad [\text{Formula 3}]$$

At this time, the total charge of the capacitors C1 and C2 remains unchanged. Accordingly, the following [formula 4] is expressed.

$$CHinit = CHafter + CH2 \qquad [\text{Formula 4}]$$

The following [formula 5] is obtained by substituting [formula 1] to [formula 3] into [formula 4] and modifying the resulting formula.

$$Vout = -(Cp1/Cp2) \times (Vafter - Vinit) \qquad [\text{Formula 5}]$$

[Formula 5] represents the subtraction operation of the voltage signal, and a gain of the subtraction result is Cp1/Cp2.

From this [formula 5], it is clear that the subtractor 17a outputs a signal representing the difference between the past photoreception signal level (Vinit) and the current photoreception signal level (Vafter).

Here, the potential Vinit corresponds to the reference level Lref described above. From the above description, as the reset switch SWr is turned ON, this potential Vinit, i.e., the reference level Lref, is reset to the current photoreception signal level, in other words, the photoreception signal level when the reset switch SWr is turned ON.

The quantizer 17b includes a transistor Q9, a transistor Q10, a transistor Q11, and a transistor Q12 and is configured as a 1.5-bit quantizer.

The transistors Q9 and Q11 are P-type transistors whereas the transistors Q10 and Q12 are N-type transistors.

As illustrated, the transistors Q9 and Q10 and the transistors Q11 and Q12 are connected in series between the power supply terminal and the grounding terminal, respectively, and the output voltage (Vout) of the subtractor 17a is input to each of the gates of the transistors Q9 and Q11. Also, a voltage Vhigh is applied to the gate of the transistor Q10, and a voltage Vlow is applied to the gate of the transistor Q12.

The output voltage Vop representing the detection result of an ON event is obtained at a connection point between the transistors Q9 and Q10 whereas the output voltage Vom representing the detection result of an OFF event is obtained at a connection point between the transistors Q11 and Q12.

Specifically, in the case where the level of the output voltage (Vafter−Vini) of the subtractor 17a on the side of the transistors Q9 and Q10 is equal to or greater than a positive threshold proportional to the voltage Vhigh, the high-level output voltage Vop is obtained at the connection point between the transistors Q9 and Q10, and in the case where the level of the output voltage of the subtractor 17a is smaller than the positive threshold, the low-level output voltage Vop is obtained. That is, a signal representing whether or not the amount of light received has increased by as much as or more than the given threshold, i.e., the detection signal Sd indicating the detection result of an ON event, is obtained at the connection point between the transistors Q9 and Q10.

Also, in the case where the level of the output voltage of the subtractor 17a on the side of the transistors Q11 and Q12 is equal to or smaller than a negative threshold proportional to the voltage Vlow, the high-level output voltage Vom is obtained at the connection point between the transistors Q11 and Q12, and in the case where the level of the output voltage of the subtractor 17a is larger than the negative threshold in question, the low-level output voltage Vom is obtained. As described above, a signal representing whether or not the amount of light received has decreased by as much as or more than the given threshold, i.e., the detection signal Sd indicating the detection result of an OFF event, is obtained at the connection point between the transistors Q11 and Q12.

The retention section 18 receives inputs of the output voltage Vop and the output voltage Vom of the quantizer 17b and retains these voltages. The retention section 18 outputs the retained output voltage Vop, i.e., the detection signal Sd indicating the detection result of an ON event, as the event signal Evnp and outputs the retained output voltage Vom, i.e., the detection signal Sd indicating the detection result of an OFF event, as the event signal Evnm.

The retention section 18 outputs a detection signal indicating the detection of an ON event in the case where an ON event occurs and outputs a detection signal indicating the detection of an OFF event in the case where an OFF event occurs.

Figure 5:
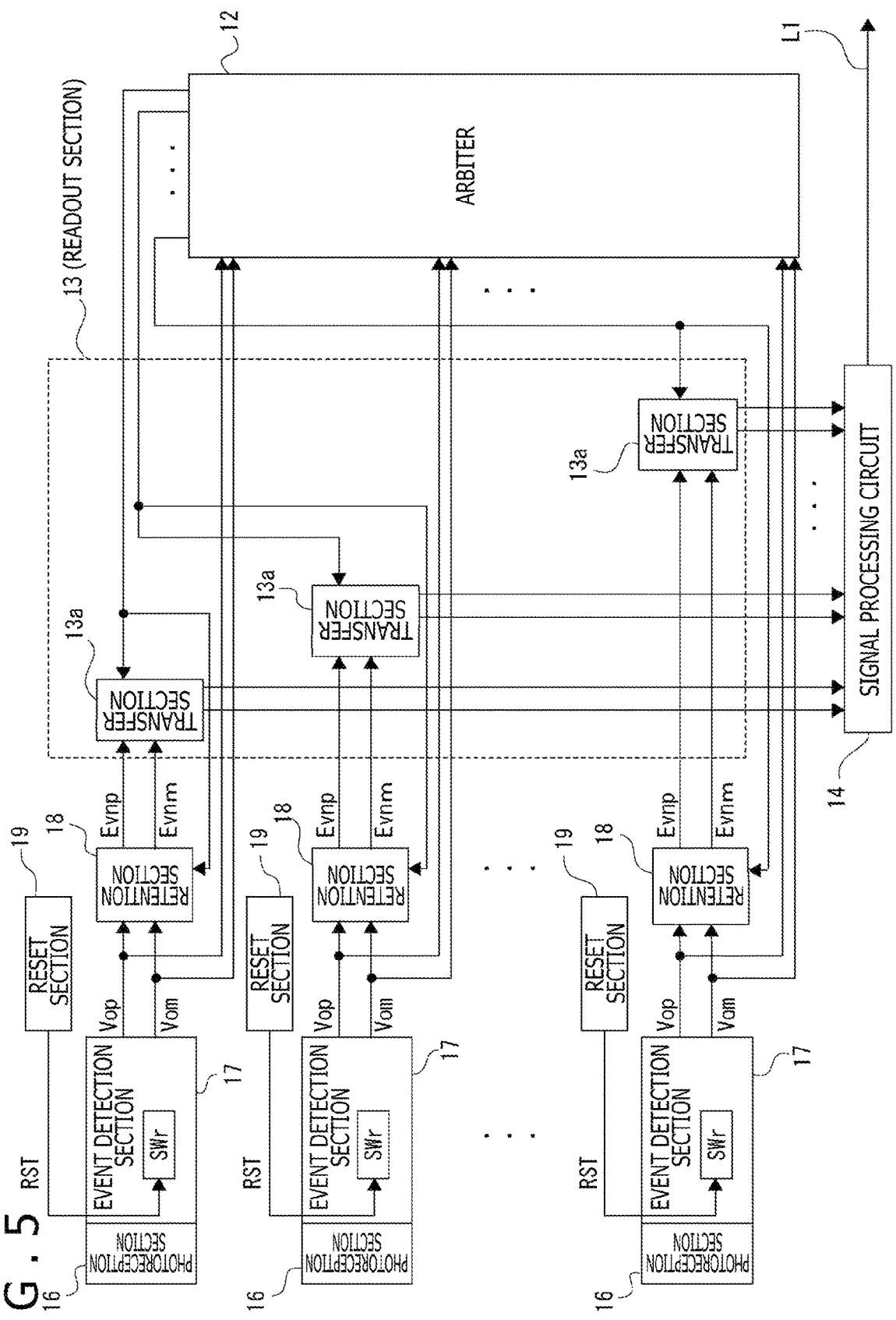
FIG. 5 is an explanatory diagram of a configuration associated with readout of an event signal in an embodiment.

FIG. 5 is an explanatory diagram of a configuration associated with readout of an event signal.

As illustrated, the readout section 13 includes a transfer section 13a for each of the pixels 15, and each of the transfer sections 13a receives inputs of event signals (Evnp, Evnm) from the retention section 18 of the corresponding pixel 15. Each of the transfer sections 13a transfers the input event signal to the signal processing circuit 14 on the basis of an instruction from the arbiter 12.

Also, each of the detection signals Sd (the output voltage Vop and the output voltage Vom) acquired by the event detection section 17 of each pixel 15 is supplied to the arbiter 12. Here, these detection signals Sd function as signals requesting the readout of event signals to the arbiter 12.

The arbiter 12 receives inputs of the detection signals Sd from each of the event detection sections 17, thus controlling the readout operation of the readout section 13 on the basis of a result of arbitration of requests based on these detection signals Sd.

Specifically, the arbiter 12 instructs the corresponding transfer section 13a of the readout section 13 to transfer an event signal to the signal processing circuit 14 such that the event signal is read out from the pixel 15 where an event occurred.

Also, the retention section 18 resets the retained detection signals Sd (the output voltage Vop and the output voltage Vom) in response to a transfer instruction (readout instruction) issued from the arbiter 12 to the transfer section 13a. Specifically, the retention section 18 resets the retained detection signals Sd to low level in response to a transfer request issued from the arbiter 12 to the transfer section 13a, a destination to which the event signals are sent from the retention section 18.

1-2. Reset Section of the First Embodiment

Here, as can be understood from the above description, the detection of an event is carried out by finding the difference between a past photoreception signal level, i.e., the reference level Lref, and a current photoreception signal level. Then, in the case where an event is detected, the reference level Lref is reset to the current photoreception signal level, thus allowing for detection of a new event.

As far as the reset of the reference level Lref is concerned, a possible option would be to reset the reference level in response to the readout of an event signal.

However, a considerable amount of time is required from receipt of a notice regarding event detection by the arbiter 12 to issuance of an instruction to read out a signal of the corresponding pixel 15. Therefore, a delay occurs in resetting the reference level Lref if the reference level Lref is reset in response to the readout as described above. That is, there is a fear that the reference level may not be swiftly updated to the photoreception signal level at the time of event detection, thus resulting in degraded accuracy of the reference level and degraded precision for detecting events due, for example, to an omission of event detection.

For this reason, in the present embodiment, the reference level Lref is reset after the detection of an event by the event detection sections 17 and before the readout of an event signal by the readout section 13.

Figure 6:
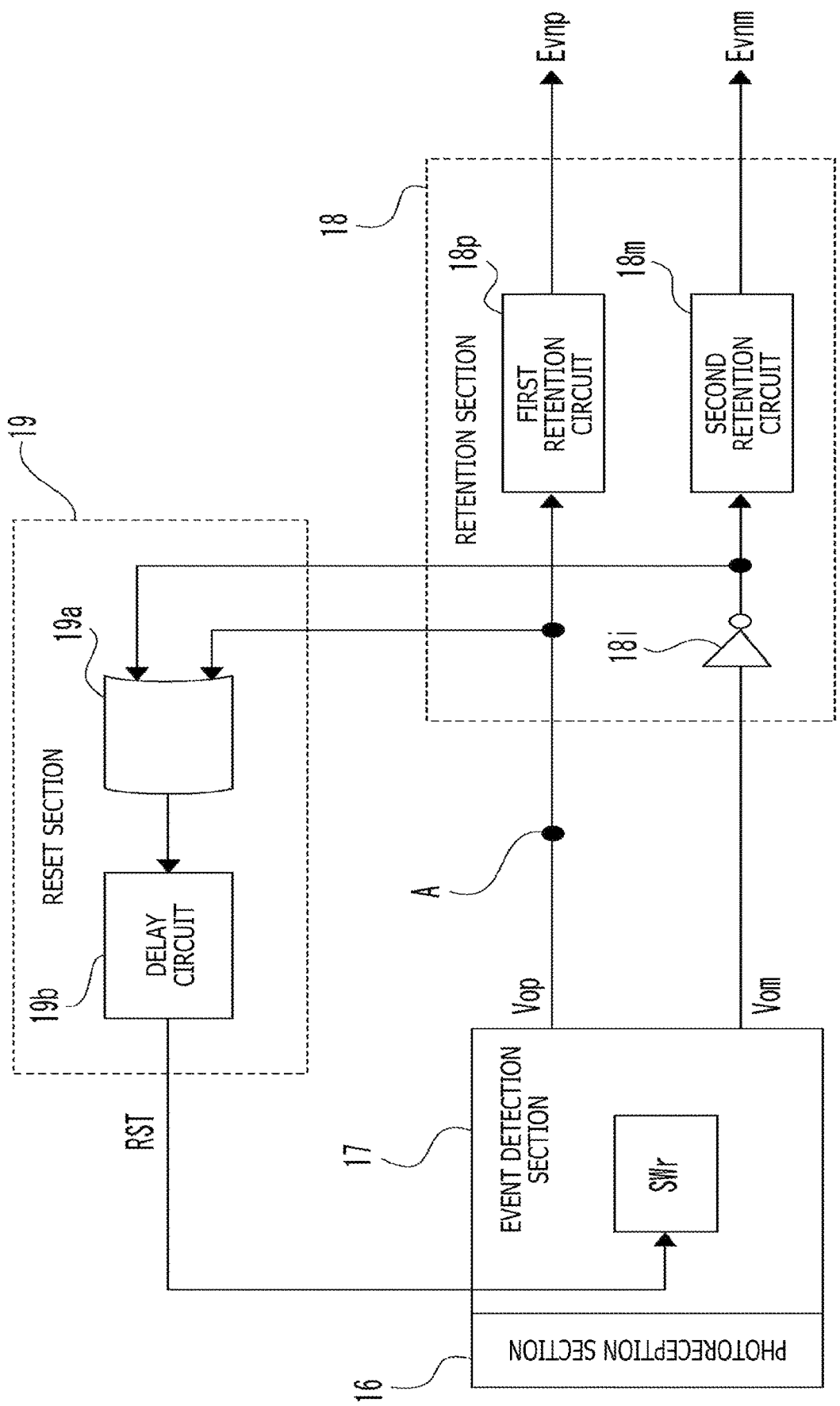
FIG. 6 is a diagram for describing a configuration example of a reset section in a first embodiment.

FIG. 6 is a diagram for describing a configuration example of the reset section 19 in a first embodiment.

It should be noted that FIG. 6 illustrates examples of internal configurations of the photoreception section 16, the event detection section 17, and the retention section 18 together with an internal configuration of the reset section 19.

As illustrated, the retention section 18 includes a first retention circuit 18p, a second retention circuit 18m, and an inverter 18i, with the output voltage Vop input to the first retention circuit 18p and the output voltage Vom input to the second retention circuit 18m via the inverter 18i. The first retention circuit 18p and the second retention circuit 18m are configured, for example, as a latch circuit. It should be noted that the first retention circuit 18p and the second retention circuit 18m may be a digital memory circuit such as latch circuit or flip-flop, or a sampling circuit having a switch, plastic, capacitance, and the like.

The reset section 19 includes an OR gate circuit 19a and a delay circuit 19b. The OR gate circuit 19a receives inputs of the output voltage Vop and the output voltage Vom supplied via the inverter 18i, and the delay circuit 19b delays an output signal from the OR gate circuit 19a, outputting the delayed signal to the reset switch SWr as the reset signal RST. It should be noted that a configuration or the like having a plurality of inverters connected in series can be adopted as the delay circuit 19b.

Figure 7:
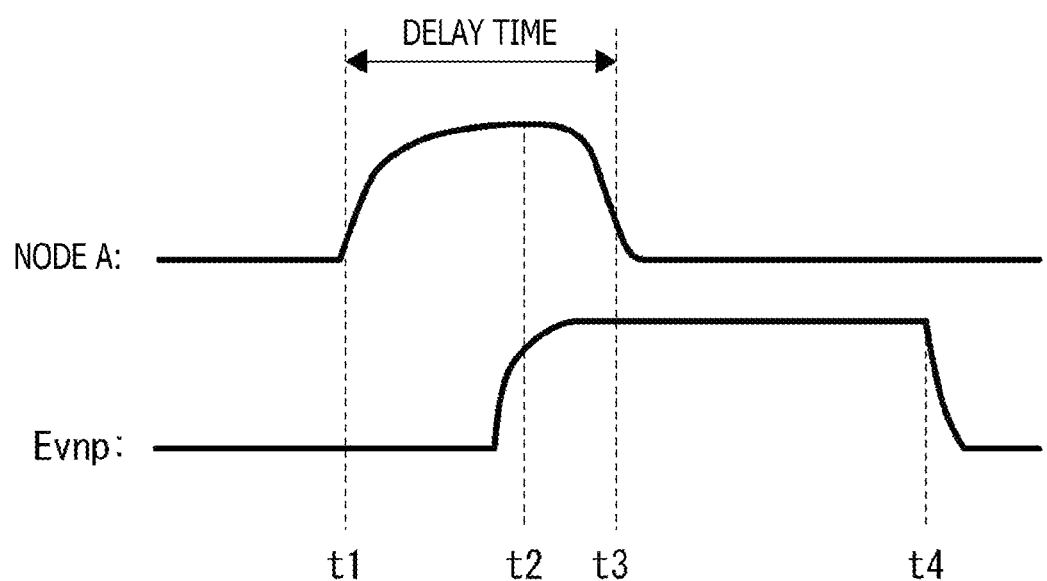
FIG. 7 is a timing chart for describing operation of circuits illustrated in FIG. 6.

FIG. 7 is a timing chart for describing operation of the circuits illustrated in FIG. 6, depicting a waveform representing a change in potential of a node A illustrated in FIG. 6 and a waveform of the event signal Evnp, the output signal of the first retention circuit 18p.

Time t1 in FIG. 7 indicates the time when an event (ON event in this case) is detected by the event detection section 17. The potential of the node A increases gradually in response to the detection of an event. That is, the output voltage Vop rises to high level.

There is a time lag until this rise in potential of the node A is reflected onto the output signal Evnp, and the output signal Evnp rises to high level at time t2 in FIG. 7. Put differently, this time t2 is the time when the retention of the event signal indicating the detection result that an event has occurred by the first retention circuit 18p is complete.

Then, the reset signal RST is output from the reset section 19 at time t3 which is the time when a delay time, generated by the delay circuit 19b, has elapsed from time t1, thus causing the reference level Lref to be reset.

Here, the delay time generated by the delay circuit 19b is set longer than a time period from time t1 to time t2. That is, the delay time is set in such a manner as to secure a sufficient amount of wait time for the detection signal retained by the retention section 18 to reach or surpass a certain level as high level.

At time t4 which is the time when a required amount of time has elapsed from time t3, the event signal is read out from the retention section 18 to the signal processing circuit 14. As described earlier, a considerable amount of time is required from the event detection to the readout of the event signal.

As can be understood from the above description, the retention section 18 retains the detection signal Sd until the readout is performed. That is, in the case where the detection signal Sd is pulled up to high level in response to event detection, that level is maintained until the level is read out.

As described above, the retention section 18 retains the detection signal Sd acquired in response to the detection of an event, thus making it possible to continuously retain the signal indicating the detection of an event until the readout is performed even if the change in amount of light received is momentary.

As described above, in the image sensor 1 of the embodiment, the reference level Lref is reset after the detection of an event by the event detection section 17 and before the readout of an event signal by the readout section 13.

This makes it possible to swiftly reset (update) the reference level used for event detection to the current photoreception signal level in response to event detection.

Accordingly, it is possible to ensure improved accuracy of the reference level Lref used for event detection, thus achieving improved precision for event detection.

FIG. 8 is a diagram for describing significance of swiftly resetting the reference level Lref in response to event detection.

On the upper and lower sides in FIG. 8, the waveform depicted by a solid line represents a change in amount of light received, and levels Lv1, Lv2, and Lv2' represent the reference levels Lref, respectively. Also, the threshold TH used for event detection is schematically depicted with double-ended arrows in FIG. 8.

On the upper side in FIG. 8, a case is illustrated where the reference level Lref is reset swiftly in response to event detection. In this case, a first event is detected at time T1 in response to the fact that the difference between the reference level Lref indicated by "Lv1" and the current photoreception signal level reaches or surpasses the threshold TH. Also, a second event is detected at time T2 in response to the fact that the difference between the reference level Lref, i.e., "Lv2" as a result of reset after the first event detection, and the current photoreception signal level reaches or surpasses the threshold TH.

Meanwhile, on the lower side in FIG. 8, a case is illustrated where the reference level Lref is reset after the first event detection (time T1) following a given delay D. In this case, the photodetection level increases during the delay D, causing the reference level Lref to be reset to "Lv2'," a level higher than "Lv2" at the time of the first event detection. For this reason, the difference between this "Lv2'" and the current photoreception signal level does not reach or surpass the threshold TH, thus resulting in an omission of event detection.

As described above, the reference level Lref is updated swiftly, thus preventing an omission of event detection and achieving improved precision for event detection.

1-3. Modification Examples Associated with Detection Signal Retention

Here, in the present embodiment, the reference level Lref is reset before the readout of a signal from the retention section 18. In such a configuration, there is a possibility that a detection signal of a new event may be generated by the event detection section 17 during a time period after the reset of the reference level Lref until the readout of a signal. That is, in the case where a new event occurs after the detection of an event and before the readout of the event signal in question, a detection signal of the new event is input to the retention section 18 that already retains the detection signal of the immediately previous event, causing the detection signal of the new event to be merged into the detection signal of the immediately previous event in the retention section 18 and resulting in an omission of event signal output.

Figure 9:
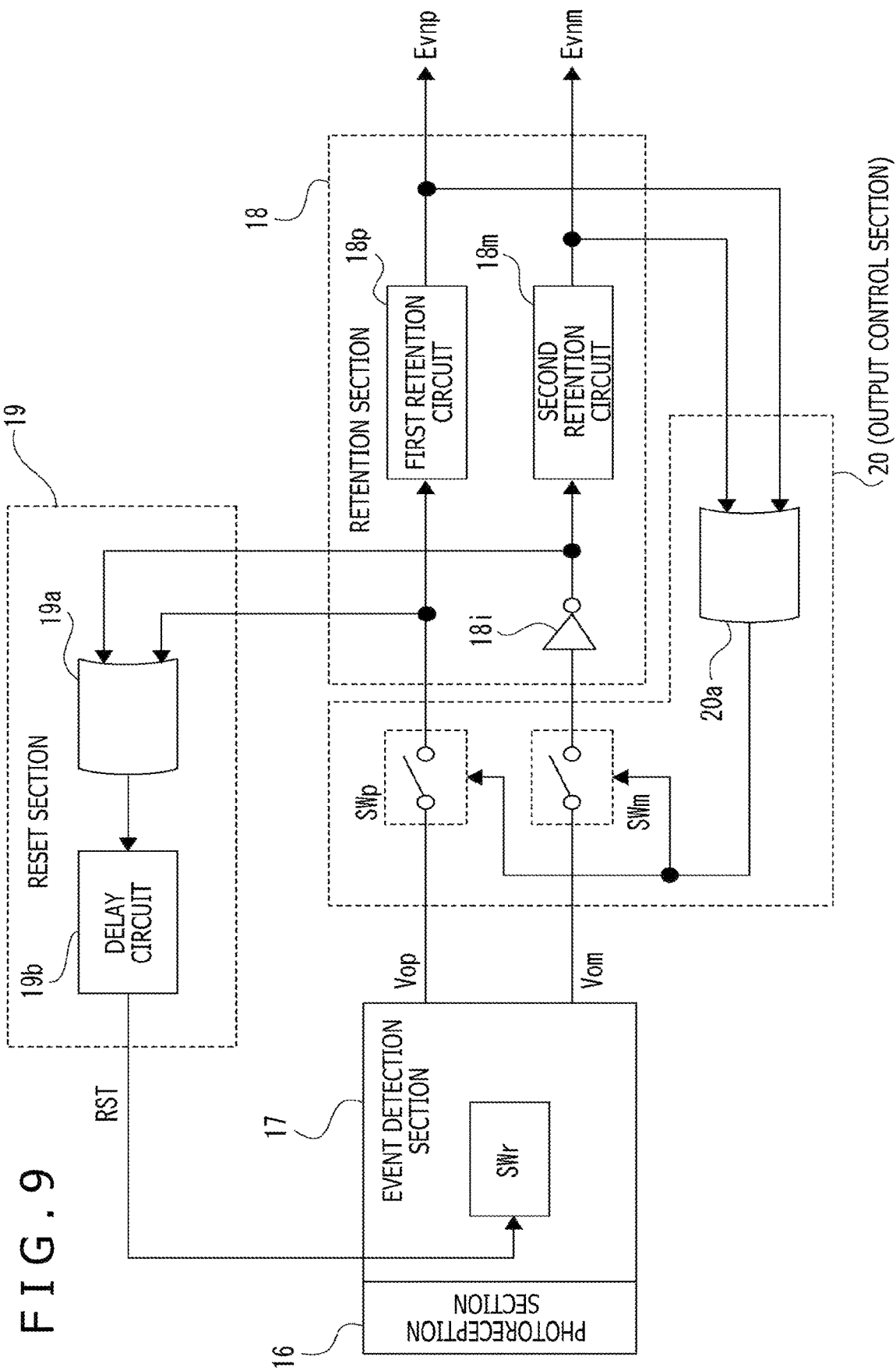
FIG. 9 is an explanatory diagram of a modification example according to detection signal retention.

For this reason, an output control section 20 as illustrated in FIG. 9 is provided, thus making it possible to prevent a new event detection signal that occurs before readout from being merged into a detection signal of an immediately previous event.

It should be noted that, in the description given below, similar parts to those described earlier are denoted by the same reference signs, and the description thereof is omitted.

As illustrated, the output control section 20 includes an OR gate circuit 20a, a switch SWp, and a switch SWm.

The OR gate circuit 20a receives inputs of the event signal Evnp, an output signal of the first retention circuit 18p, and the event signal Evnm, an output signal of the second retention circuit 18m.

The switch SWp is inserted in a supply line of the output voltage Vop from the event detection section 17 to the first retention circuit 18p whereas the switch SWm is inserted in a supply line of the output voltage Vom from the event detection section 17 to the inverter 18i, and each switch is controlled to turn ON and OFF by an output signal of the OR gate circuit 20a. Here, when the output signal of the OR gate circuit 20a is low level, the switch SWp and the switch SWm are OFF.

Because of such a configuration, the switch SWp and the switch SWm turn OFF in response to the fact that the event signal Evnp or the event signal Evnm reaches or surpasses a certain level as high level, thus making it possible to prevent a new event detection signal that occurs before readout from being merged into a detection signal of an immediately previous event.

Also, according to the above configuration, in the case where the levels of the detection signals retained by the first retention circuit 18p and the second retention circuit 18m fall below a certain level (i.e., in the case where the detection signals are reset to low level) as a result of readout of the detection signals retained by the first retention circuit 18p and the second retention circuit 18m in response to an event detection, the switch SWp and the switch SWm turn ON. This allows for the first retention circuit 18p and the second retention circuit 18m to retain new event detection signals.

As described above, the provision of the output control section 20 illustrated in FIG. 9 makes it possible to output an event signal of a new event that occurs before readout as a different signal from an event signal of an event that occurred immediately previously, thus preventing an omission of event signal output.

It should be noted that, in the output control section 20 illustrated in FIG. 9, the OR gate circuit 20a is not required for the configuration that detects only ON events (or only OFF events). That is, in this case, it is possible to reduce the components of the output control section 20 to a minimum of only the switch SWp or the switch SWm.

2. Second Embodiment

Figure 10:
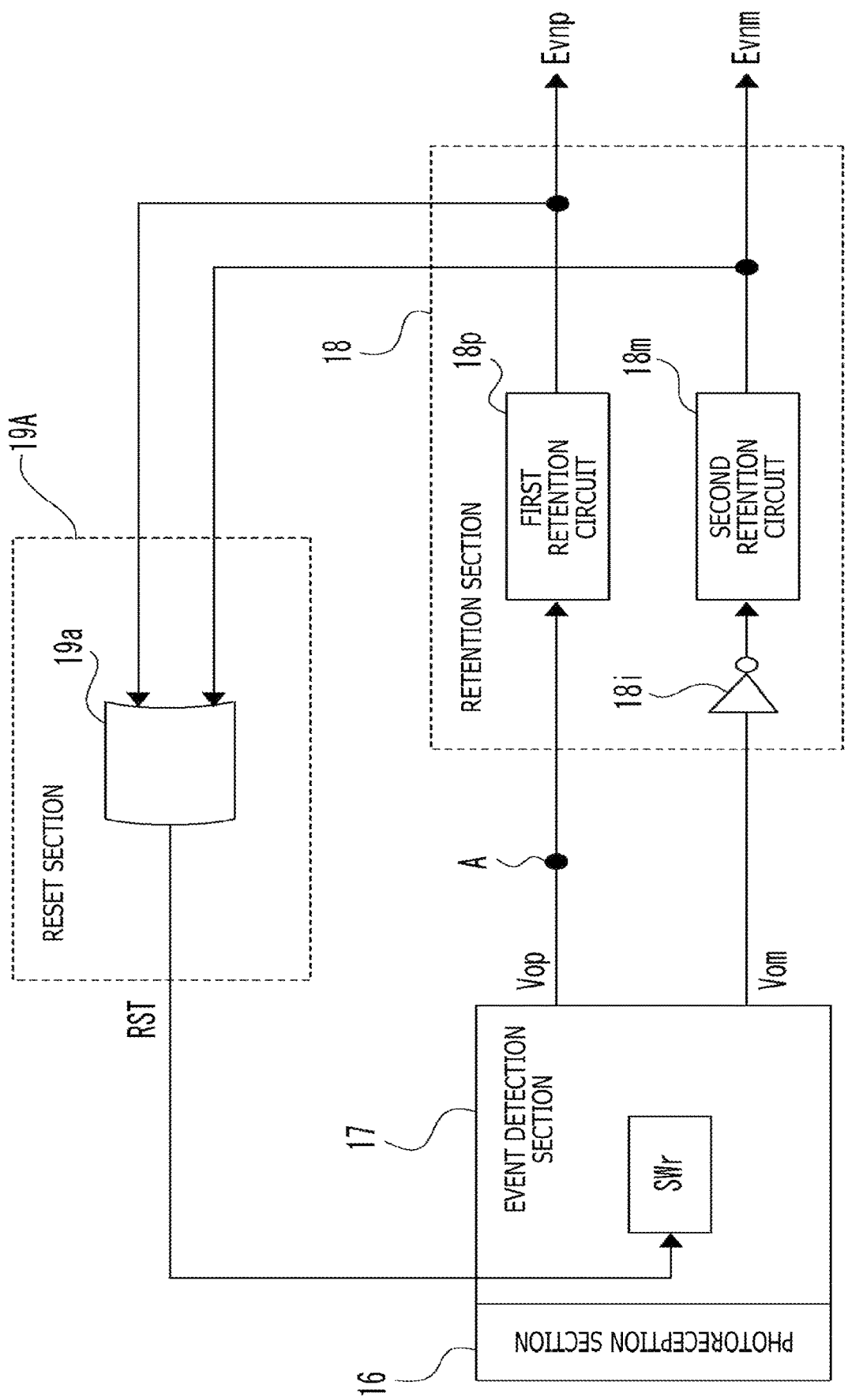
FIG. 10 is a diagram for describing an internal configuration example of a pixel included in an image sensor as a second embodiment.

FIG. 10 is a diagram for describing an internal configuration example of the pixel 15 included in the image sensor 1 as a second embodiment.

The second embodiment differs from the first embodiment in that a reset section 19A is provided in place of the reset section 19.

The reset section 19A includes an OR gate circuit 19a that receives inputs of the event signal Evnp, an output signal of the first retention circuit 18p, and the event signal Evnm, an output signal of the second retention circuit 18m. The output signal of this OR gate circuit 19a is output to the reset switch SWr of the event detection section 17 as the reset signal RST.

Figure 11:
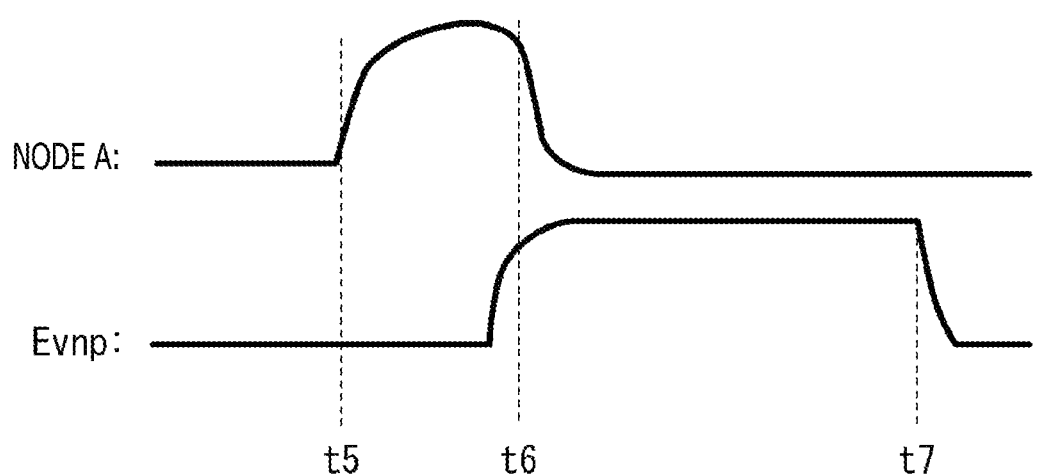
FIG. 11 is a timing chart for describing operation of circuits illustrated in FIG. 10.

FIG. 11 is a timing chart for describing operation of circuits illustrated in FIG. 10, depicting a waveform of the potential change at the node A and a waveform of the event signal Evnp illustrated in FIG. 10.

Time t5 in FIG. 11 indicates the time when an event (ON event in this case) is detected by the event detection section 17, and time t6 indicates the time when the event signal Evnp rises to high level. At this time t6, the reset section 19A outputs the reset signal RST, thus resetting the reference level Lref.

Time t7 indicates the time when the event signal Evnp is read out in response to event detection.

As described above, the reset section 19A of the second embodiment resets the reference level Lref on the basis of the output signal of the retention section 18.

This resets the reference level Lref in response to the fact that the level of the detection signal retained by the retention section 18 reaches or surpasses a certain level (i.e., high level), thus allowing for an event signal to be output properly. This also eliminates the need for the delay circuit 19b that delays a reset timing until the level of the detection signal retained by the retention section 18 reaches or surpasses a certain level.

It should be noted that a configuration having the output control section 20 illustrated in FIG. 9 can also be adopted in the second embodiment.

3. Third Embodiment

Although there has been described so far an example in which both ON and OFF events are detected by the event detection section 17 simultaneously and in parallel, ON and OFF events may be detected in a time-divided manner. First and second examples of a third embodiment associated with such time-divided detection will be described below.

Figure 12:
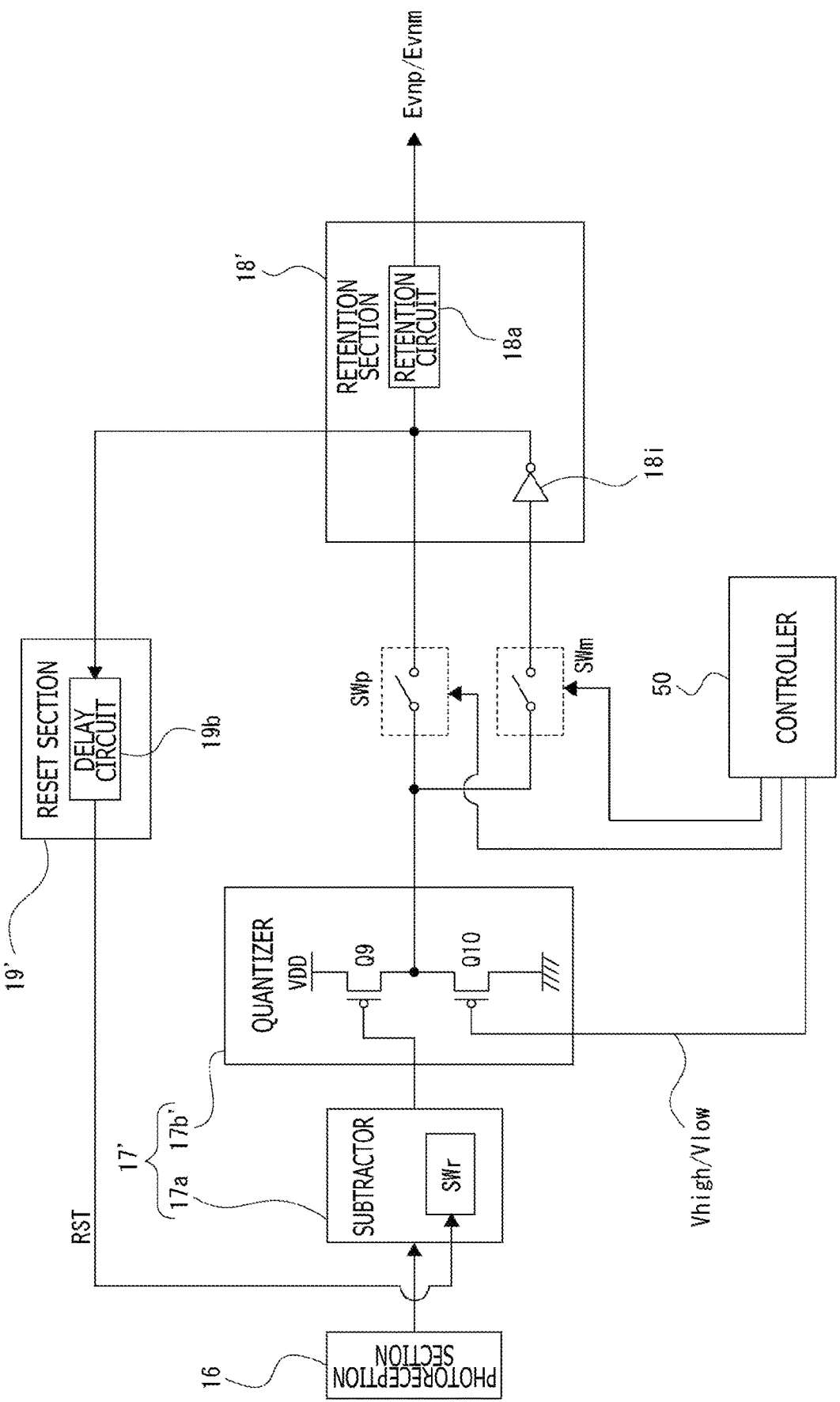
FIG. 12 is a diagram for describing an internal configuration example of a pixel included in the image sensor as a first example of a third embodiment.

FIG. 12 is a diagram for describing an internal configuration example of the pixel 15 included in the image sensor 1 as a first example of the third embodiment.

The image sensor 1 as the first example illustrated in FIG. 12 differs from the case of the first embodiment (FIG. 4) in that an event detection section 17' is provided in place of the event detection section 17, a retention section 18' is provided in place of the retention section 18, that a reset section 19' is provided in place of the reset section 19, and that the switch SWp, the switch SWm, and a controller 50 are provided.

In the event detection section 17', a quantizer 17b' is provided in place of the quantizer 17b. The quantizer 17b' differs from the quantizer 17b in that the transistors Q11 and Q12 have been omitted. In this case, there is only a single line of output of the output signal of the quantizer 17b' which is obtained at the connection point between the transistors Q9 and Q10.

The retention section 18' includes a single retention circuit 18a as a retention circuit and an inverter 18i.

As illustrated, the output line from the quantizer 17b' branches out into one line that goes by way of the switch SWp and another line that goes by way of the switch SWm. The line that goes by way of the switch SWp is connected to the retention circuit 18a, and the line that goes by way of the switch SWm joins the switch SWp via the inverter 18i first and then connects to the retention circuit 18a.

The reset section 19' differs from the reset section 19 in that the OR gate circuit 19a has been omitted, and the delay circuit 19b of the reset section 19' receives input of a signal acquired at a junction between the line that goes by way of the switch SWp and the line that goes by way of the switch SWm.

The controller 50 controls a gate voltage of the transistor Q10 in the quantizer 17b' and controls the switches SWp and SWm to turn ON and OFF.

Specifically, the controller 50 switches the gate voltage of the transistor Q10 between a voltage Vhigh and a voltage Vlow. Then, the controller 50 controls the switches SWp and SWm to turn ON and OFF alternately in synchronism with such switching between the voltages Vhigh and Vlow. That is, while the voltage Vhigh is selected, the switch SWp is controlled to turn ON, and the switch SWm is controlled to turn OFF, and while the voltage Vlow is selected, the switch SWp is controlled to turn OFF, and the switch SWm is controlled to turn ON.

As can be understood from the description of the first embodiment, while the voltage Vhigh is selected, the detection signal Sd indicating an ON event detection result is acquired by the quantizer 17b'. Meanwhile, while the voltage Vlow is selected, the detection signal Sd indicating an OFF event detection result is acquired by the quantizer 17b'.

Accordingly, as the controller 50 controls the switches SWp and SWm to turn ON and OFF in synchronism with switching between the voltages Vhigh and Vlow, the detection signal Sd indicating an ON event detection result is input to the retention circuit 18a via the switch SWp while the voltage Vhigh is selected. Meanwhile, while the voltage Vlow is selected, the detection signal Sd indicating an OFF event detection result is input to the retention circuit 18a via the switch SWm and the inverter 18i.

As described above, in the configuration illustrated in FIG. 12, ON and OFF events are detected in a time-divided manner.

Then, in the configuration illustrated in FIG. 12, only the single retention circuit 18a is provided in the retention section 18' to deal with such time-divided detection, thus allowing the retention circuit 18a to retain the ON event detection signal Sd and the OFF event detection signal Sd in a time-divided manner.

In the case where an ON event takes place while the voltage Vhigh is selected, the detection signal Sd retained by the retention circuit 18a is read out as the event signal Evnp by the arbiter 12. Similarly, in the case where an OFF event takes place while the voltage Vlow is selected, the detection signal Sd retained by the retention circuit 18a is read out as the event signal Evnm by the arbiter 12.

Here, the reset section 19' receives input of the signal at the junction between the line that goes by way of the switch SWp and the line that goes by way of the switch SWm. Such a configuration makes it possible to reset the reference level Lref before the readout of the event signal Evp both in the case where an ON event takes place while the voltage Vhigh is selected and in the case where an OFF event takes place while the voltage Vlow is selected.

It should be noted that the controller 50 may be provided for each pixel 15 or for each plurality of pixels 15.

Figure 13:
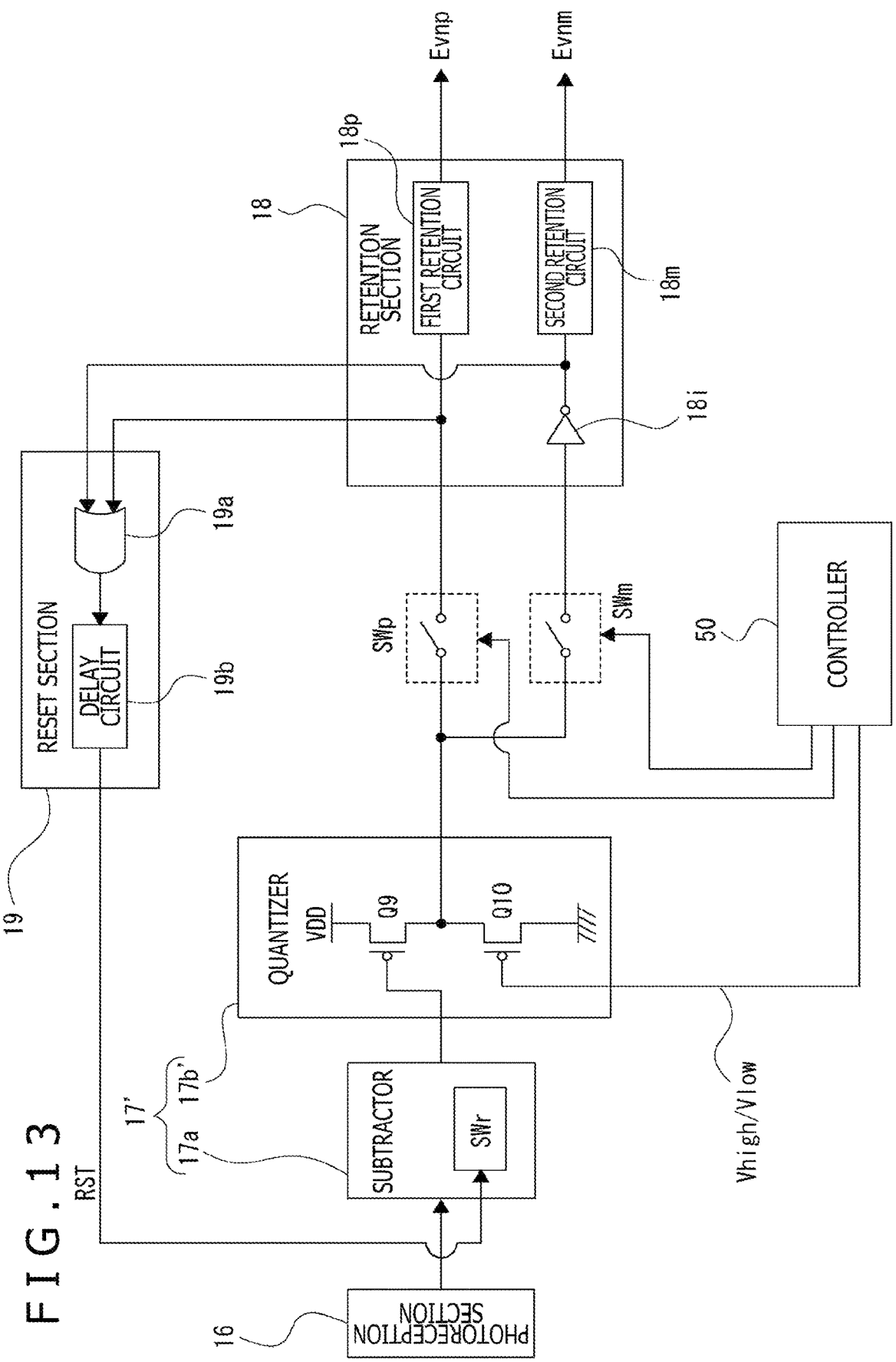
FIG. 13 is a diagram for describing an internal configuration example of a pixel included in the image sensor as a second example of the third embodiment.

FIG. 13 is a diagram for describing an internal configuration example of the pixel 15 included in the image sensor 1 as a second example of the third embodiment.

The second example differs from the first example illustrated in FIG. 12 in that the retention section 18 is provided in place of the retention section 18', thus allowing the ON event detection signal Sd and the OFF event detection signal Sd acquired in a time-divided manner to be retained separately by the first retention circuit 18p and the second retention circuit 18m.

Also, the reset section 19 is provided in place of the reset section 19' to deal with the provision of the retention section 18 in place of the retention section 18' as described above. This makes it possible to reset the reference level Lref before the readout of the event signal Evp both in the case where an ON event takes place while the voltage Vhigh is selected and in the case where an OFF event takes place while the voltage Vlow is selected.

4. Fourth Embodiment

4-1. Outline of the Scanning Scheme

Although there has been described so far an example of an arbiter scheme (asynchronous readout scheme) in which the arbiter 12 reads out the event signal Evn of the corresponding pixel 15 in response to event detection, the readout of the event signal Evn can also be accomplished by a scanning scheme that carries out readout synchronously row by row in the pixel array section 11.

Figure 14:
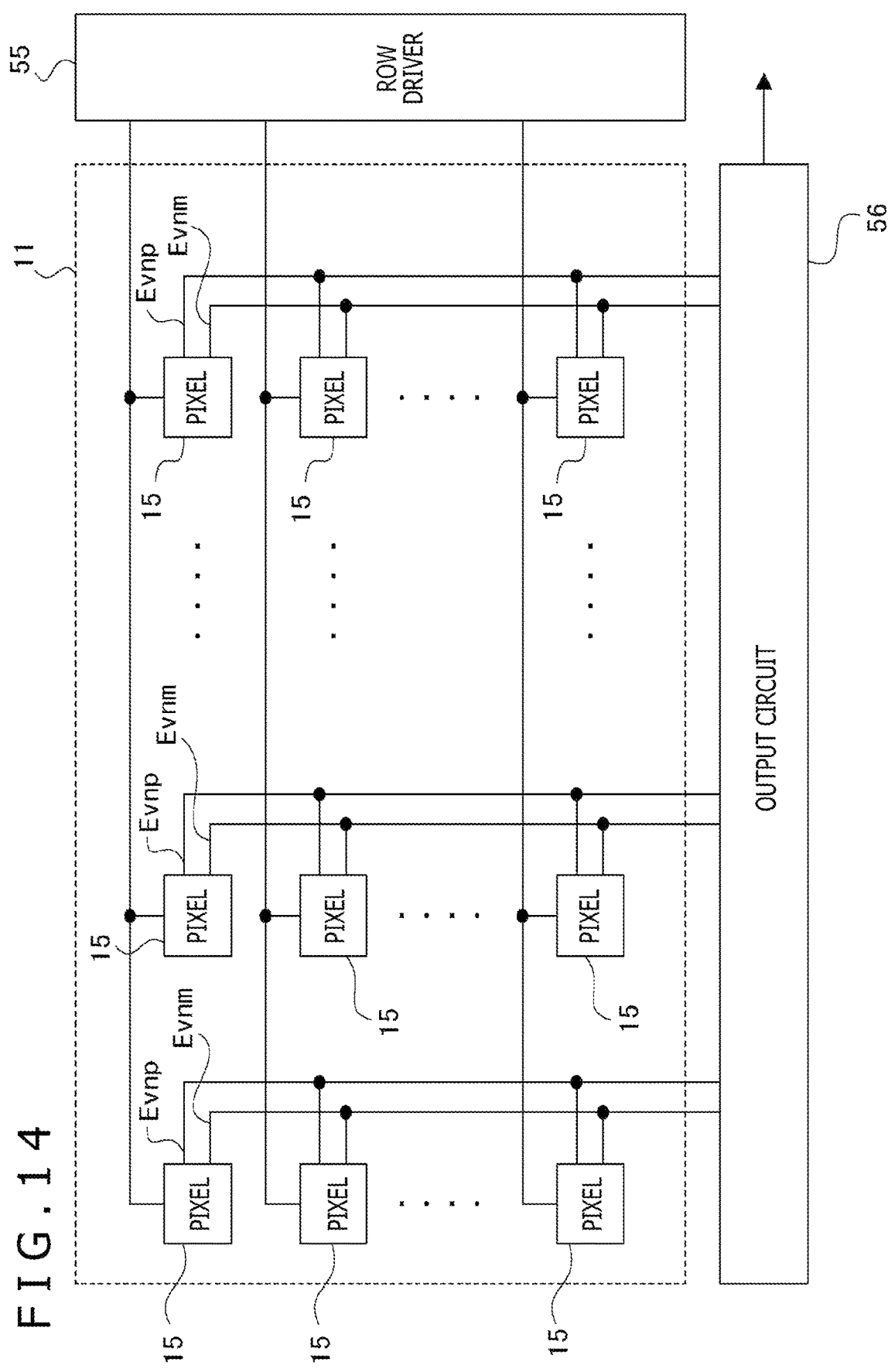
FIG. 14 is a diagram for describing a configuration of the image sensor in the case where a scanning scheme is adopted.

FIG. 14 is a diagram for describing a configuration of the image sensor 1 in the case where the event signal Evn is read out through the scanning scheme. It should be noted that FIG. 14 illustrates an extraction of only the configuration associated with the readout of the event signal Evn.

As described earlier, the pixel array section 11 has the plurality of pixels 15 arranged in a two-dimensional grid pattern. In this case, the internal configuration of each pixel 15 is similar to that described in the first embodiment with reference to FIGS. 6, 9, 10, and the like.

A row driver 55 selects rows of the pixel array section 11. Specifically, the row driver 55 sequentially selects the plurality of rows of the pixel array section 11 one at a time at preset intervals. When a row is selected by the row driver 55, the value retained by the retention section 18 is output to an output circuit 56 from each of the pixels 15 in the selected row. Specifically, in this case, the first retention circuit 18p and the second retention circuit 18m are provided in the retention section 18 of the pixel 15. Therefore, the value retained by the first retention circuit 18p and the value retained by the second retention circuit 18m are output from each of the pixels 15 in the selected row. This is represented by the notations "Evnp" and "Evnm" for each pixel 15 in FIG. 14.

The output circuit 56 determines whether or not an event has been detected in each of the pixels 15 on the basis of the output value of each pixel 15 in the selected row, that is, whether or not at least an ON event or an OFF event has been detected in the pixel, and generates, for the pixel where an event has been detected, pixel address information and outputs the information. Here, the pixel address is, for example, in the form of (row, column) coordinates. As an example, the output circuit 56 acquires a row coordinate from the row selected by the row driver 55 and combines the coordinate with information regarding the column of the pixel where the event has been detected in the row, thus generating pixel address information.

It should be noted that the output circuit 56 may output, together with pixel address information of the pixels where an event has been detected, which event, an ON event or an OFF event, has been detected in the pixels.

With the configuration described above, the event signals Evn are read out on a row-by-row basis for the pixels 15 where an event has been detected. In other words, the readout is performed synchronously on a row-by-row basis.

4-2. Counting Scheme

Here, in the case where the scanning scheme as described above is adopted, there is a longer time delay from the event detection to the readout of the event signal Evn than in the case where the arbiter scheme is adopted.

Figure 15:
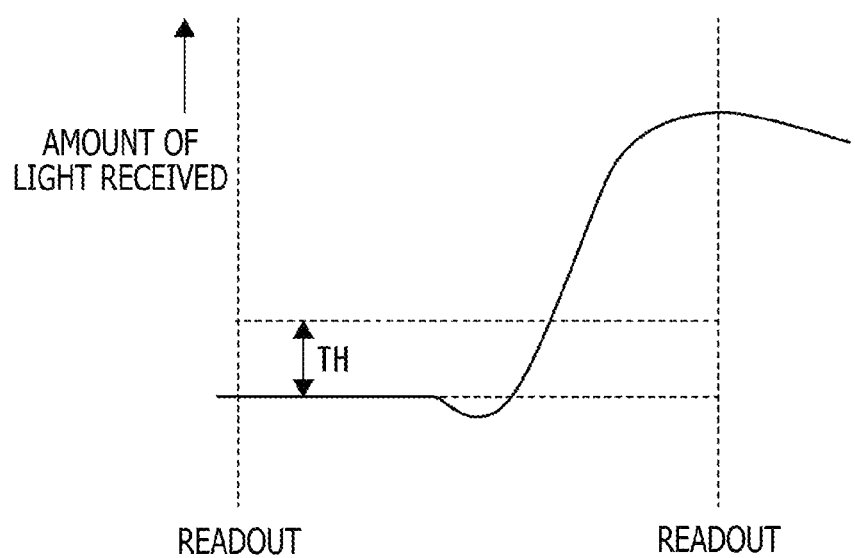
FIG. 15 is an explanatory diagram in the case where an amount of light received changes significantly.

A longer time delay until the readout as described above leads to acquisition of a detection result of only one event even in the case of a significant change in amount of light received as illustrated, for example, in FIG. 15. That is, although should be otherwise treated as detection of a plurality of events, such a significant change in amount of light received is treated as detection of a single event, possibly resulting in omissions of event detection.

For this reason, in the present embodiment, the reset section 19 is provided, thus allowing to reset the reference level Lref during wait for readout, i.e., count the number of event occurrences and read out the count value as an event signal during wait for readout while at the same time detecting a plurality of events during wait for readout.

Figure 16:
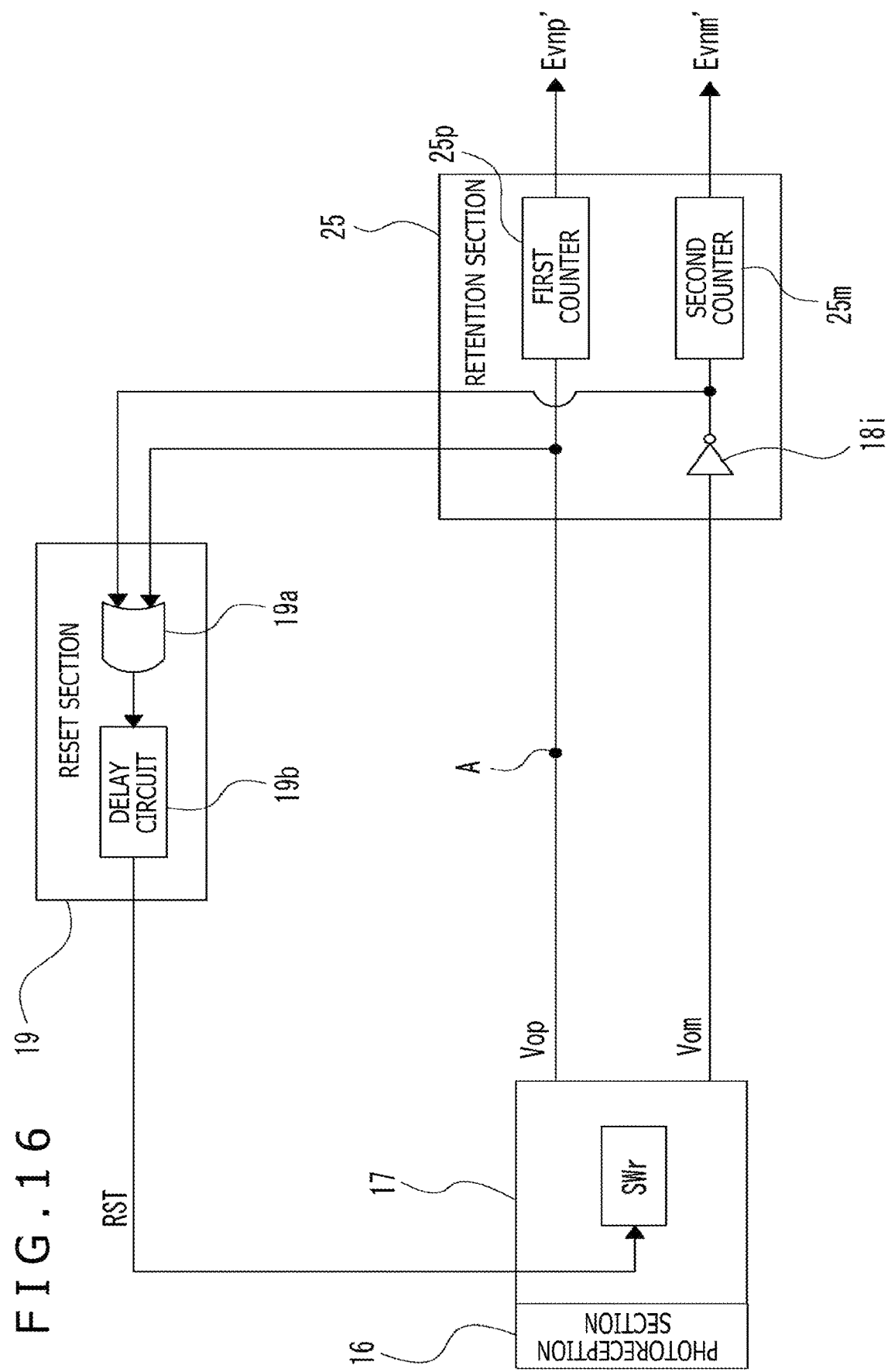
FIG. 16 is a diagram for describing an internal configuration example of a pixel in the case where a counting scheme is adopted.

FIG. 16 is a diagram for describing an internal configuration example of the pixel 15 in the case where a counting scheme for counting the number of event occurrences is adopted.

In this case, the internal configuration of the pixel 15 differs from the case described in FIG. 6 in that the retention section 25 is provided in place of the retention section 18.

The retention section 25 includes a first counter 25p, a second counter 25m, and the inverter 18i. As illustrated, the first counter 25p receives input of the output voltage Vop from the event detection section 17. The second counter 25m receives input of the output voltage Vom from the event detection section 17 via the inverter 18i.

Figure 17:
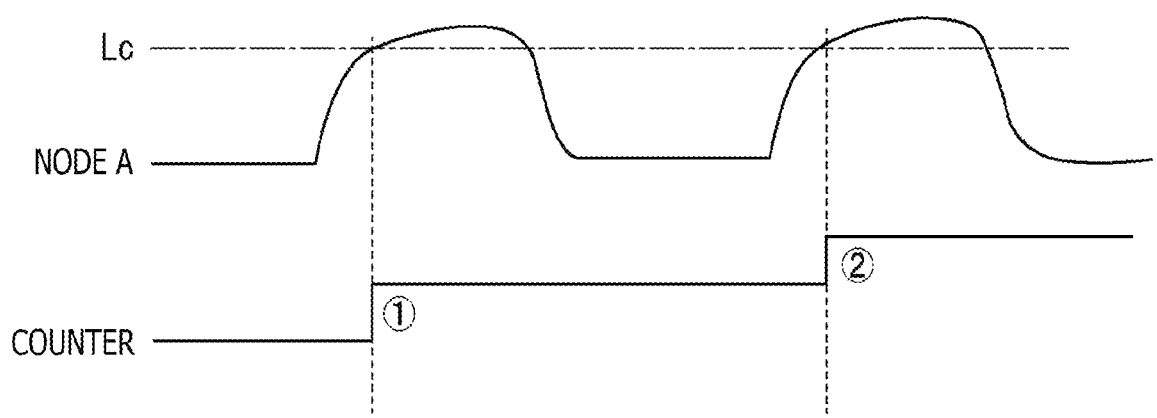
FIG. 17 is an explanatory diagram of operation of a counter in an embodiment.

FIG. 17 is an explanatory diagram of operation of the counter.

It should be noted that although FIG. 17 is an explanatory diagram of operation of the first counter 25p, the second counter 25m operates in a similar manner to the first counter 25p. Therefore, a redundant description will be avoided.

In the case where the amount of light received changes significantly as illustrated in FIG. 15 described earlier, the potential of the node A (refer to FIG. 16) changes from high level to low level a plurality of times as illustrated each time the reference level Lref is reset by the reset section 19.

A count reference value Lc as illustrated is set in the first counter 25p. The first counter 25p increments its count value each time the potential of the node A reaches or surpasses the count reference value Lc. This allows the number of event occurrences to be counted during wait for readout.

Figure 18:
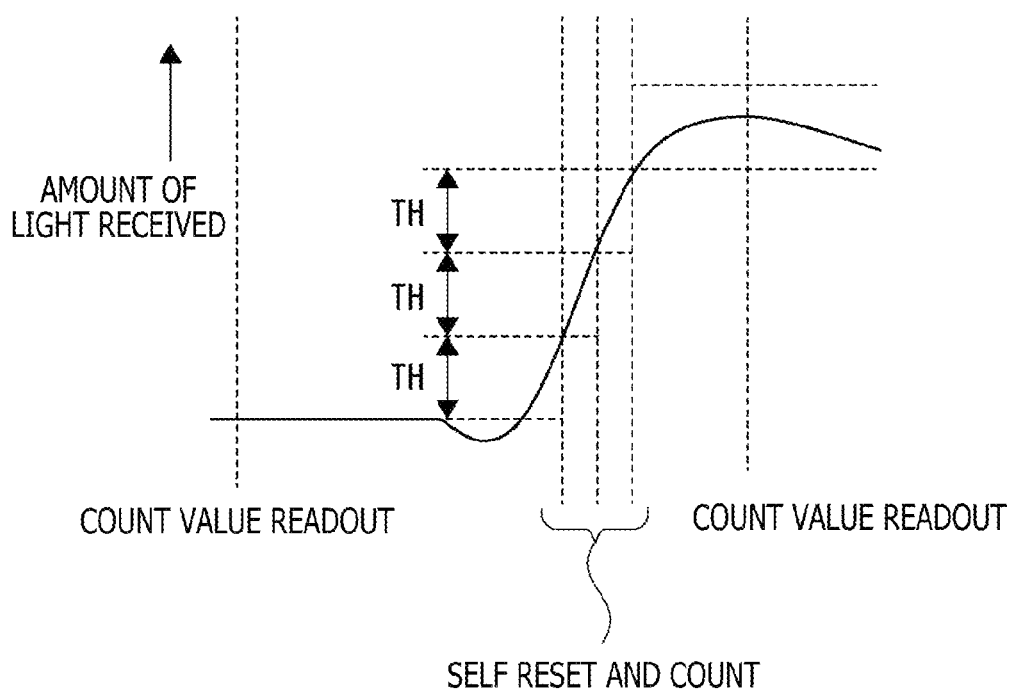
FIG. 18 is an explanatory diagram of an action of the counting scheme.

FIG. 18 illustrates an explanatory diagram of an action of the counting scheme.

Even in the case where the amount of light received changes significantly as illustrated in FIG. 15, it is possible to count the number of event occurrences during wait for readout with self-reset of the reference level Lref by the reset section 19 and counting operation of the first counter 25p (or the second counter 25m).

This makes it possible to prevent an omission of event detection. This also makes it possible to not only detect whether or not the amount of light received has changed but also estimate a variation of the amount of light received.

Here, in the configuration illustrated in FIG. 16, each of the output voltage Vop and the output voltage Vom functions as "a "detection signal" indicating the detection of an event" when a corresponding event, either an ON event or an OFF event, occurs. For this reason, counting of the numbers of event occurrences by the first counter 25p and the second counter 25m, respectively, on the basis of the output voltages Vop and Vom, and retention of the count values corresponds to retention of "detection signals" the number of which corresponds to the number of event occurrences and accordingly corresponds to a mode of retention of "detection signals."

Also, if such retention of count values corresponds to retention of "detection signals," readout of count values retained by the retention section 25 can be said to correspond to a mode of readout of event signals as "detection signals" retained by the retention section 25. From this standpoint, the count values read out from the first counter 25p and the second counter 25m in FIG. 16 are denoted as event signals Evnp' and Evnm', respectively.

It should be noted that although FIG. 16 illustrates a configuration in which the reset signal RST is output on the basis of the output voltage Vo, a configuration may be adopted instead in which the reset signal RST is output, for example, when the counts of the first counter 25p and the second counter 25m are updated.

Here, in the case where the counting scheme is adopted, the output circuit 56 illustrated in FIG. 14 receives inputs of the values of the first counter 25p and the second counter 25m from each of the pixels 15 in the row selected by the row driver 55. In this case, the output circuit 56 outputs not only the addresses of the pixels whose count values are 1 or more as pixel addresses but also information indicating which event, an ON event or an OFF event, has been detected in the pixel and the count value for each of the pixels where an event has been detected.

4-3. Modification Examples Related to the Counting Scheme

In the case where the counting scheme described above is adopted, event detection based on the time division scheme as described in the third embodiment is also applicable.

Figure 19:
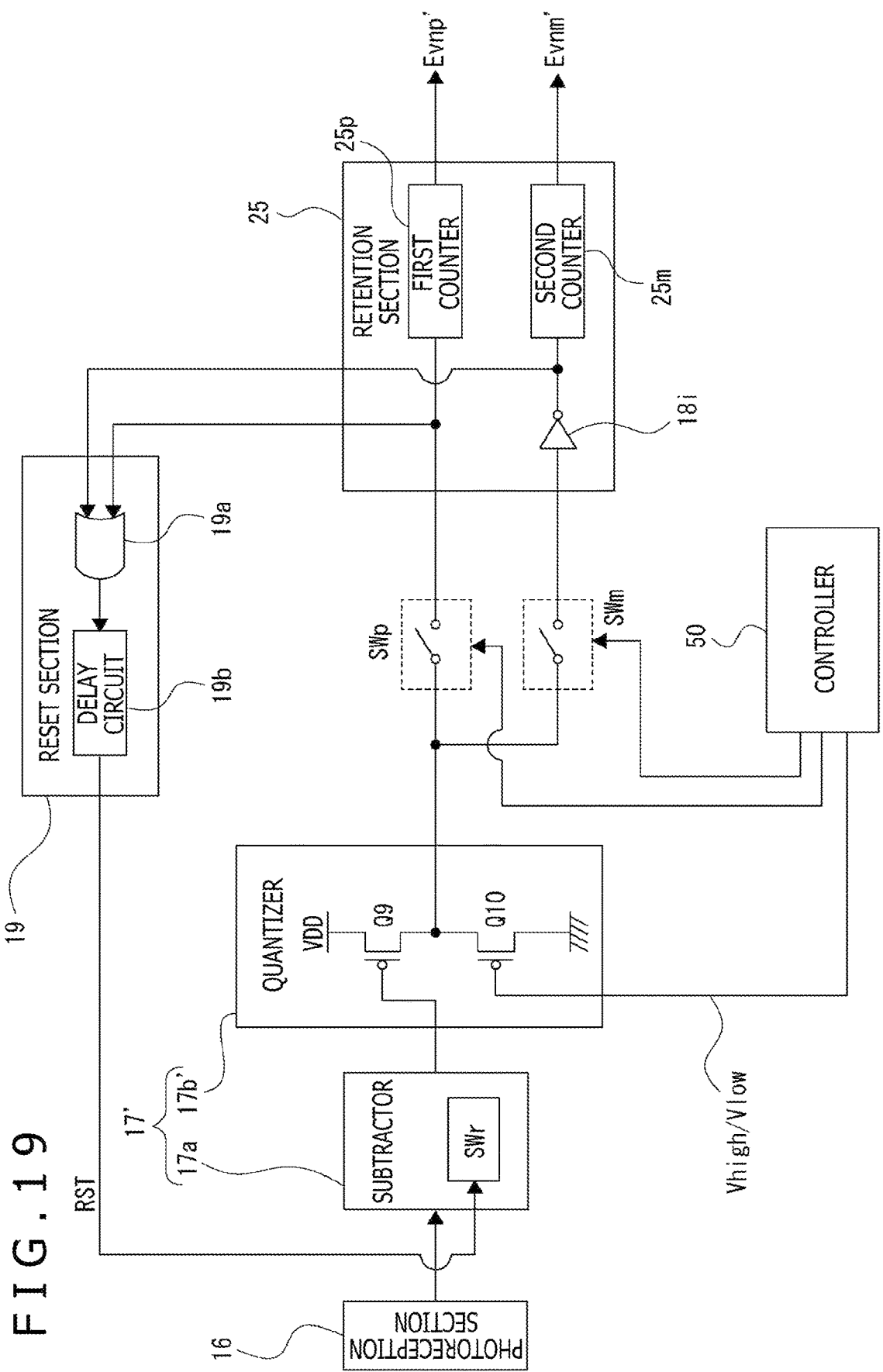
FIG. 19 is a diagram illustrating an example of an internal configuration of a pixel in the case where a time division scheme is applied to the counting scheme.
Figure 20:
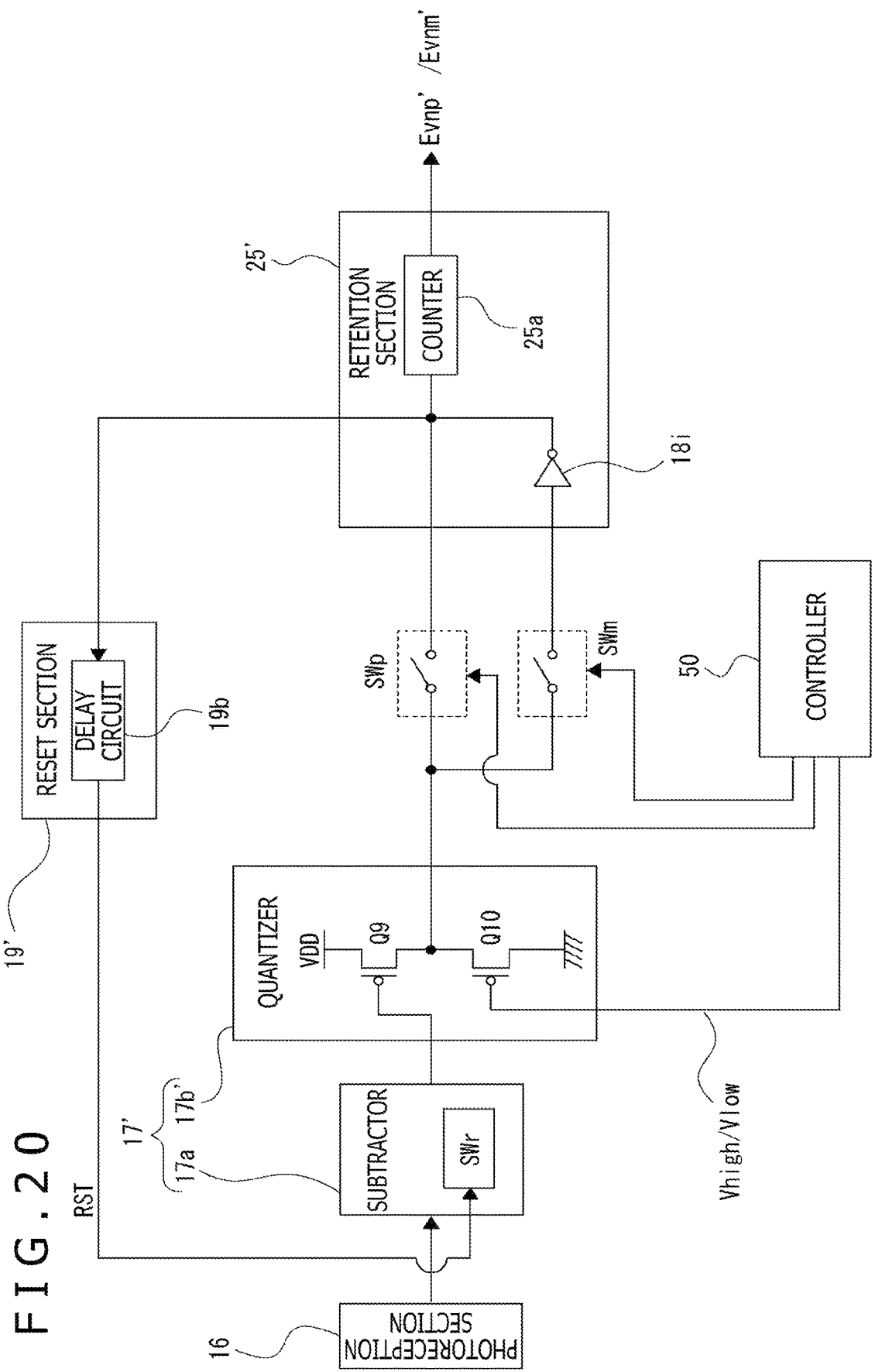
FIG. 20 is a diagram illustrating another example of an internal configuration of a pixel in the case where the time division scheme is applied to the counting scheme.

FIGS. 19 and 20 illustrate internal configurations of the pixel 15 in the case where the time division scheme is applied to the counting scheme, respectively.

In the example illustrated in FIG. 19, the retention section 25 is provided at a subsequent stage to the configuration (event detection section 17' and switches SWp and SWn) for time-division-based detection illustrated in FIGS. 12 and 13 described earlier, thus allowing for ON and OFF events to be counted separately by the first counter 25p and the second counter 25m, respectively.

Here, in the case where ON and OFF events are counted separately by the counters as illustrated in FIG. 19, a possible option for counting ON and OFF events in a time-divided manner and reading out count values (reading out the event signals Evnp' and Evnm') would be to proceed as described below.

That is, letting the time period from when the row driver 55 selects a certain row to when the row driver 55 selects that row again be denoted as a "readout waiting period Pw," a first half (or a second half) of the readout waiting period Pw is spent on counting ON events (i.e., ON period of the switch SWp) and a second half (or a second half) thereof is spent on counting OFF events (i.e., ON period of the switch SWm), and the count values of the first counter 25p and the second counter 25m are read out simultaneously when a row is selected by the row driver 55.

Alternatively, ON and OFF event counting periods can be switched alternately each time a row is selected, an example of which is spending the even-numbered readout waiting periods Pw on counting ON events and the odd-numbered readout waiting periods Pw on counting OFF events. In this case, the readout of the count value of the first counter 25p and the readout of the count value of the second counter 25m are switched alternately on a row-by-row basis in the row driver 55.

In the example illustrated in FIG. 20, the retention section 25' is provided in place of the retention section 25 in the example illustrated in FIG. 19. As illustrated, the retention section 25' includes a single counter 25a and the inverter 18i, and the counter 25a receives input of the signal acquired at the junction between the line that goes by way of the switch SWp from the quantizer 17b' and the line that goes by way of the switch SWm and the inverter 18i from the quantizer 17b'. That is, the common counter 25a is used to count ON events and OFF events. Specifically, the counter 25a can count the number of ON event occurrences and the number of OFF event occurrences as the controller 50 switches between the switches SWp and SWm alternately.

In the case where the common counter 25a is used to count ON events and OFF events as illustrated in FIG. 20, it is impossible to switch between ON event counting and OFF event counting halfway through the readout waiting time Pw. For this reason, in the case where the common counter 25a is used as illustrated in FIG. 20, the ON event counting period and the OFF event counting period are switched alternately on a row-by-row basis, an example of which is spending the even-numbered readout waiting periods Pw on counting ON events and the odd-numbered readout waiting periods Pw on counting OFF events.

It should be noted that although an example is described above in which the counting scheme is applied to the case where the counting scheme is adopted, the counting scheme is also applicable to the case where the arbiter scheme is adopted. In the case where the arbiter scheme is adopted, the number of event occurrences from the occurrence of an event to the readout under instruction from the arbiter 12 is counted.

Also, the time division scheme is also applicable to the case where the counting scheme is applied to the arbiter scheme. When the time division scheme is applied, an ON event count value is read out under instruction from the arbiter 12 if ON events are detected, and an OFF event count value is read out under instruction from the arbiter 12 if OFF events are detected as a result of an ON event detection process and an OFF event detection process carried out in a time-divided manner. At this time, a single common counter may be used. Alternatively, two separate counters, one for ON events and another for OFF events, may be provided.

5. Modification Examples Related to Pixel Configuration

Here, although examples have been described so far in which the single photoreception section 16 and the single event detection section 17 (or the event detection section 17') are provided for each pixel 15, a configuration having the plurality of photoreception sections 16 and the plurality of event detection section 17 for each pixel 15 can also be adopted. One of such examples with the plurality of photoreception sections 16 and the plurality of event detection section 17 for each pixel 15 is a Bayer arrangement of the photoreception sections 16 that receive light beams of R (red), G (green), and B (blue), respectively.

At this time, events are possibly detected on a pixel-by-pixel basis rather than per photoreception section 16. That is, the detection of an event in any one of the plurality of event detection sections 17 in the pixel 15 is treated as detection of an event in that pixel 15.

Then, a possible option in this case would be to provide the reset section 19 for each pixel 15 rather than for each event detection section 17. That is, as will be described below in a first modification example, the one reset section 19 is provided per pixel so that the reference level Lref of all the event detection sections 17 in the pixel 15 is reset in response to detection of an event by one of the event detection sections 17 in the pixel 15.

Figure 21:
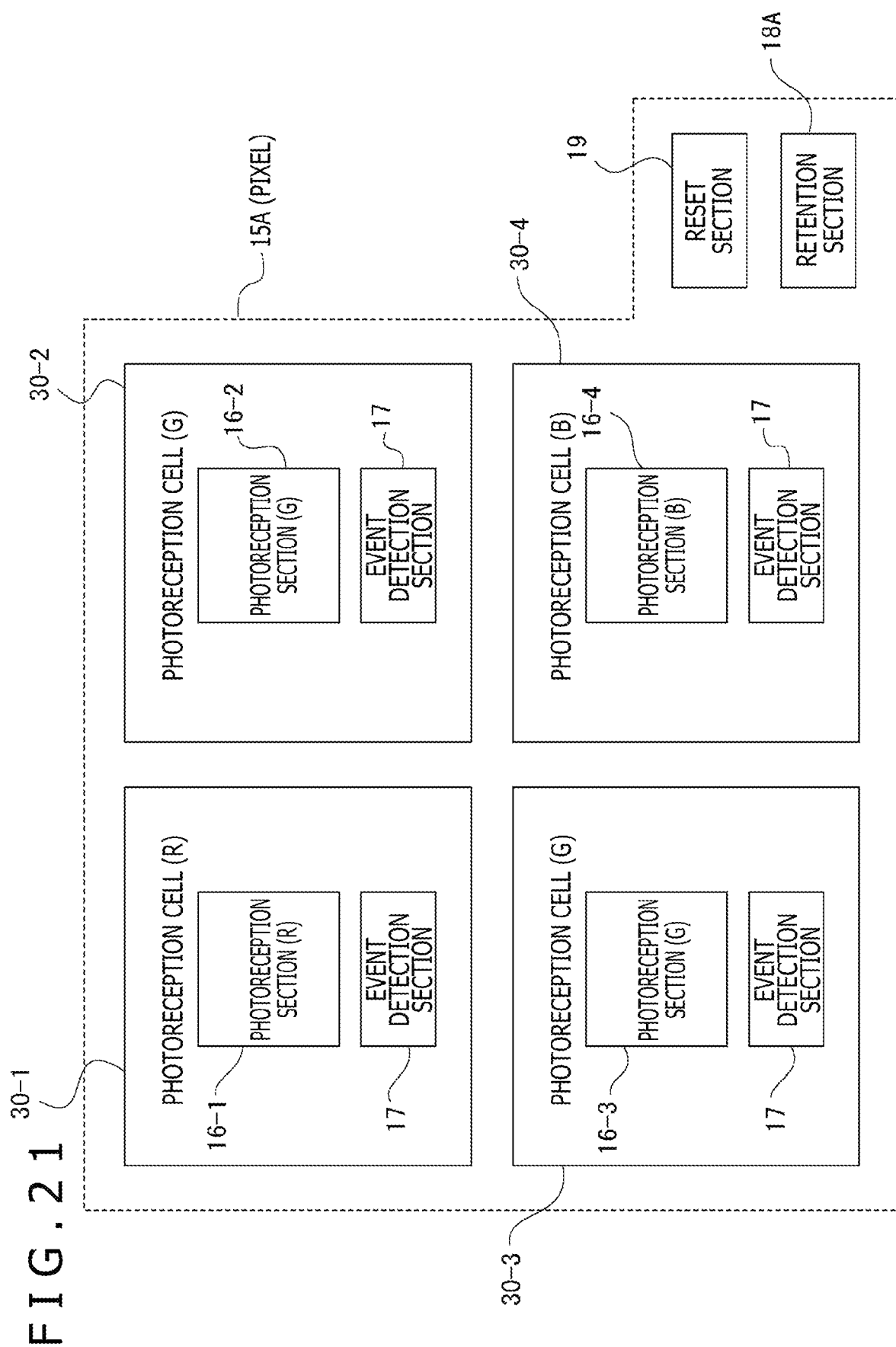
FIG. 21 is a diagram illustrating a configuration example of a pixel in an image sensor as a first modification example.

FIG. 21 illustrates a configuration example of a pixel 15A in the image sensor 1 as the first modification example.

As illustrated, the pixel 15A includes four photoreception cells 30, i.e., a photoreception cell 30-1 for receiving red light, a photoreception cell 30-2 and a photoreception cell 30-3 for receiving green light, and a photoreception cell 30-4 for receiving blue light, and the pixel 15A further includes the reset section 19 and a retention section 18A.

The photoreception cell 30-1 includes a photoreception section 16-1 having a red light color filter to receive red light and the event detection section 17. The photoreception cell 30-2 and the photoreception cell 30-3 include a photoreception section 16-2 and a photoreception section 16-3 having green light color filters to receive green light, respectively, and the event detection sections 17. The photoreception cell 30-4 includes a photoreception section 16-4 having a blue light color filter to receive blue light and the event detection section 17.

In the pixel 15A, the photoreception sections 16-1, 16-2, 16-3, and 16-4 are arranged in a Bayer pattern.

Figure 22:
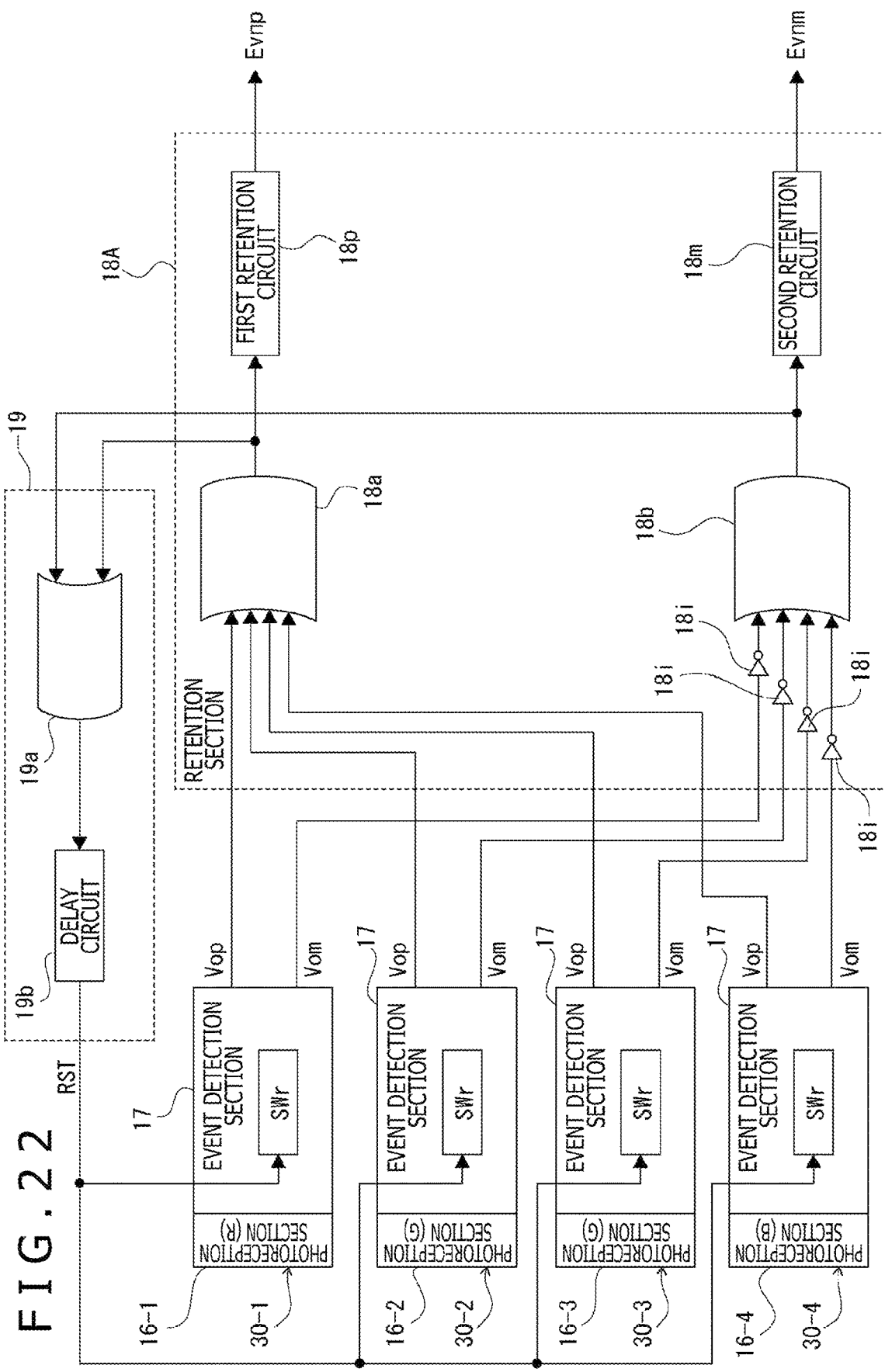
FIG. 22 is a diagram for describing a configuration example of a retention section included in the image sensor as the first modification example.

FIG. 22 is a diagram for describing a configuration example of the retention section 18A included in the image sensor 1 as the first modification example. FIG. 22 illustrates internal configuration examples of the reset section 19, the photoreception section 16, the event detection section 17, and the retention section 18 together with a configuration example of the retention section 18A.

As illustrated, the retention section 18A includes not only the first retention circuit 18p and the second retention circuit 18m but also the OR gate circuit 18a, an OR gate circuit 18b, and the four inverters 18i.

As illustrated, the OR gate circuit 18a receives inputs of the output voltages Vop from the event detection sections 17 of the respective photoreception cells 30 (30-1 to 30-4) whereas the OR gate circuit 18b receives inputs of the output voltages Vom from the event detection sections 17 of the respective photoreception cells 30, respectively, via the corresponding inverters 18i.

The output signal of the OR gate circuit 18a is supplied as an input signal to the first retention circuit 18p and to the OR gate circuit 19a of the reset section 19 whereas the output signal of the OR gate circuit 18b is supplied as an input signal to the second retention circuit 18m and to the OR gate circuit 19a.

In this case, the reset signal RST of the reset section 19 is output to the reset switches SWr of the event detection sections 17 of the respective photoreception cells 30.

With such a configuration, the reset section 19 in the image sensor 1 as the first modification example resets the reference level Lref of all the event detection sections 17 in the pixel 15A in response to the detection of an event in at least one of the plurality of event detection sections 17 in the pixel 15A.

Also, according to the configuration of the retention section 18A of the first modification example, there is a single line of output of each event signal output in response to the detection of an event (event signal Evnp or event signal Evnm in the present example) for each pixel 15A.

In the first modification example described above, in the case where the plurality of photoreception sections 16 and the plurality of event detection section 17 are provided for each pixel, the reference level Lref of all the event detection sections 17 of the pixel is reset on condition that an event has been detected by one of the event detection sections 17 of the pixel. Also, in the first modification example, an example is described in which a single line of output is provided for each of the event signals Evnp and Evnm output for each pixel.

However, a configuration may be adopted as in a second modification example which will be described below in which the reference level Lref of all the event detection sections 17 of the pixel is reset on condition that events have been detected by the plurality of event detection sections 17 of the pixel and in which the events Evnp and Evnm of all the lines (photoreception channels) where events have been detected can be output rather than having a single line of output for each of the event signals Evnp and Evnm.

Figure 23:
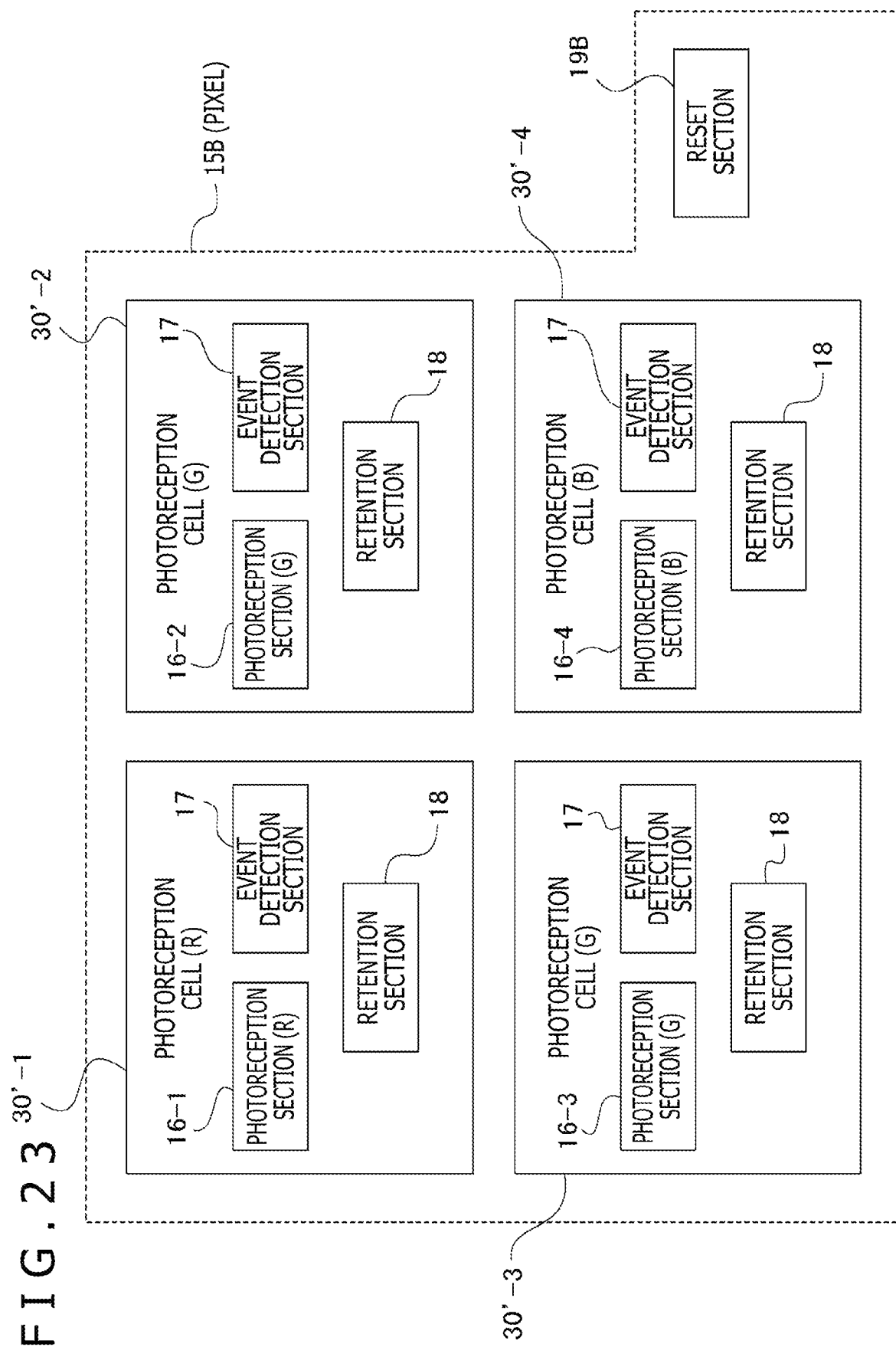
FIG. 23 is a diagram illustrating a configuration example of a pixel included in the image sensor as a second modification example.

FIG. 23 illustrates a configuration example of a pixel 15B included in the image sensor 1 as the second modification example. The pixel 15B differs from the pixel 15A of the first modification example in that photoreception cells 30'-1, 30'-2, 30'-3, and 30'-4 are provided in place of the photoreception cells 30-1, 30-2, 30-3, and 30-4 and that a reset section 19B is provided in place of the reset section 19.

The photoreception cells 30'-1, 30'-2, 30'-3, and 30'-4 differ, respectively, from the photoreception cells 30-1, 30-2, 30-3, and 30-4 in that the retention section 18 has been added.

Figure 24:
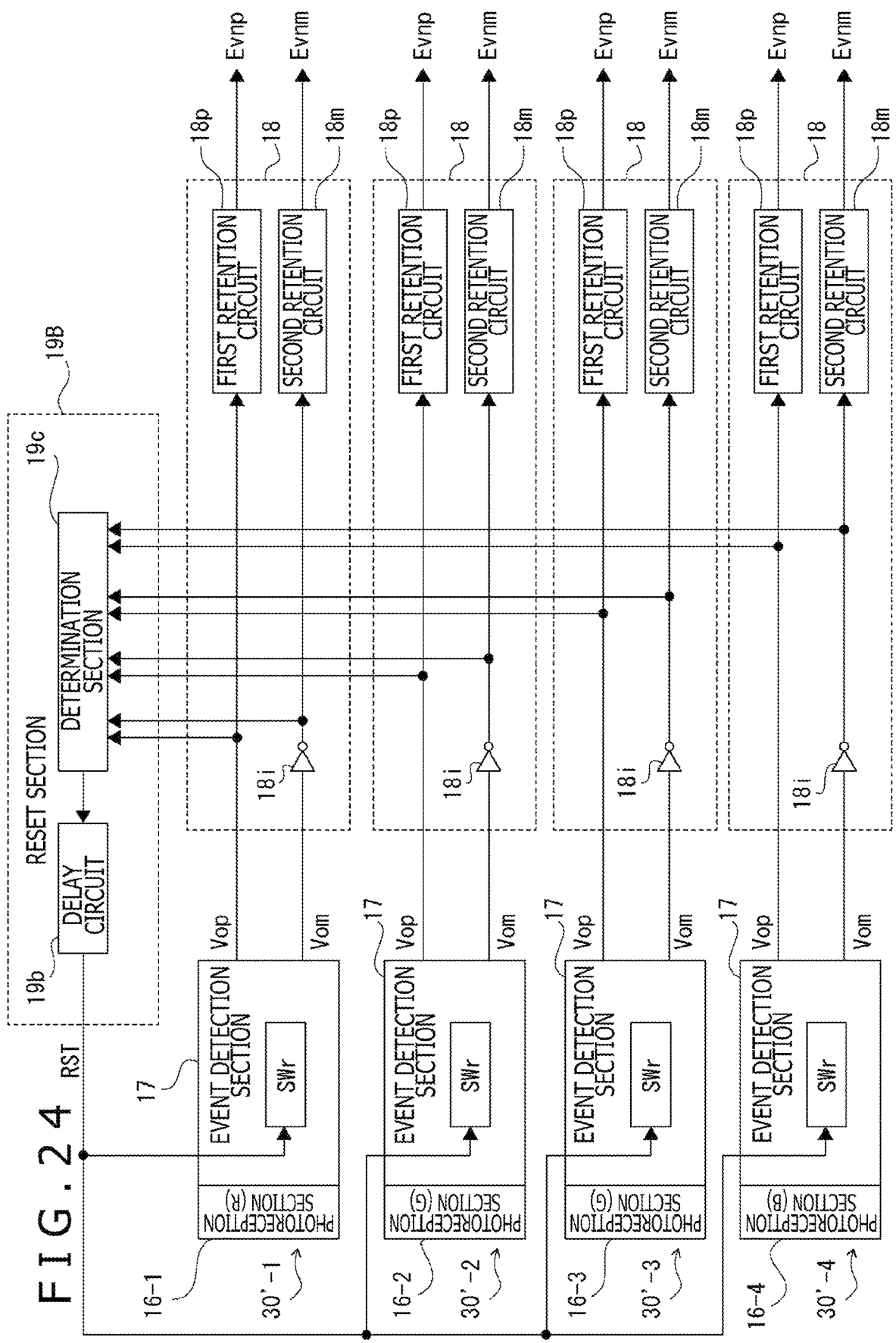
FIG. 24 is a diagram for describing a configuration example of a reset section included in the image sensor as the second modification example.

FIG. 24 is a diagram for describing a configuration example of the reset section 19B included in the image sensor 1 as the second modification example. FIG. 24 illustrates an internal configuration example of the retention section 18 in each of the photoreception cells 30'-1, 30'-2, 30'-3, and 30'-4 together with a configuration example of the reset section 19B.

As illustrated, the reset section 19B includes a determination section 19c and the delay circuit 19b. In this case, the delay circuit 19b delays the output signal of the determination section 19c and outputs the delayed signal to the reset switches SWr of the event detection sections 17 in the respective photodetection cells 30' (30'-1 to 30'-4) as the reset signal RST.

The determination section 19c receives inputs of the output voltages Vop of the event detection sections 17 in the respective photodetection cells 30' and inputs of the output voltages Vom of these event detection sections 17 via the inverters 18i of the respective corresponding retention sections 18.

The determination section 19c pulls its output voltage up to high level in response to the fact that, of the four lines of the output voltages Vop and the four lines of the output voltages Vom input as described above, N thereof (where N is a natural number equal to 2 or more and 4 or less) go up to high level.

This resets the reference level Lref of all the event detection sections 17 in the pixel 15B on condition that the plurality of event detection sections 17 in the pixel 15B have detected events.

Also, according to the configuration illustrated in FIG. 24, it is possible to output the events Evnp and Evnm of all the lines where events have been detected for each pixel 15B.

It should be noted that the configuration of the second embodiment is also applicable to the first and second modification examples described above. Specifically, as for the first modification example, a configuration can be adopted in which the OR gate circuit 19a receives inputs of the event signals Evnp and Evnm. Also, as for the second modification example, a configuration can be adopted in which the determination section 19c receives inputs of the event signals Evnp and Evnm from the respective photodetection cells 30' (30'-1 to 30'-4). It should be noted that, in this case, the delay circuit 19b is not required in the reset sections 19 and 19B.

Also, it is possible to prevent an omission of event detection by applying a configuration similar to the output control section 20 illustrated in FIG. 9 to the first and second modification examples.

Also, the configurations of the first and second modification examples are similarly applicable to the case where the time-division-based detection described in the third embodiment is performed and to the case where the scanning scheme and the counting scheme described in the fourth embodiment are adopted.

6. Other Modification Examples

It should be noted that the specific examples described above are merely examples and that the present technology can take on various configurations as modification examples.

In the above description, for example, the present technology is applied to the case where the event detection section 17 or the event detection section 17' detected both ON events and OFF events. However, the present technology can be suitably applied to the configuration in which the event detection section 17 detects only ON events (or only OFF events).

Also, as for specific circuit configurations of the respective sections illustrated, in particular, the circuit configurations associated with event signal readout and the like, mere examples are illustrated, and other configurations can also be adopted.

7. Conclusion of the Embodiments

As described above, an image sensor (image sensor 1) as an embodiment includes a photoreception section (photoreception section 16), an event detection section (event detection section 17 or 17'), a retention section (retention section 18, 18A, 18', 25, or 25'), a readout section (readout section 13 or a row driver 55 and an output circuit 56), and a reset section (reset section 19, 19A, or 19B). The photoreception section acquires an electric signal proportional to an amount of light received as a photoreception signal. The event detection section detects a change in the amount of light received as an event by finding a difference between a past photoreception signal level, i.e., a reference level (reference level Lref), and a current photoreception signal level. The retention section receives input of a detection signal (output voltage Vop or Vom) indicating the detection of an event from the event detection section and retains the detection signal. The readout section reads out the detection signal retained by the retention section as an event signal. The reset section resets the reference level to the current photoreception signal level of the photoreception section after the detection of an event by the event detection section and before the readout of an event signal by the readout section.

This makes it possible to swiftly reset (update) the reference level used for event detection to the current photoreception signal level in response to event detection.

Accordingly, it is possible to ensure improved accuracy of the reference level used for event detection, thus achieving improved precision for event detection.

Also, the retention section is provided, thus allowing for an event signal to be output properly even if the amount of light received changes in such a manner that the difference decreases during a time period after the detection of an event by the event detection section and before the readout of an event signal by the readout section.

Also, in the image sensor as an embodiment, the reset section (reset section 19 or 19B) resets the reference level on the basis of the detection signal output from the event detection section.

This makes it possible to reset the reference level after the detection of an event by the event detection section and before the readout of an event signal by the readout section.

Accordingly, it is possible to ensure improved accuracy of the reference level used for event detection, thus achieving improved precision for event detection.

Further, in the image sensor as an embodiment, the reset section resets the reference level on the basis of a signal obtained by delaying the detection signal.

This makes it possible to delay a timing when the reference level is reset (i.e., timing when the detection of a new event is initiated) until the level of the detection signal retained by the retention section reaches or surpasses a certain level.

Accordingly, it is possible to output an event signal properly.

Still further, in the image sensor as an embodiment, the reset section (reset section 19A) resets the reference level on the basis of the output signal of the retention section.

This resets the reference level in response to the fact the level of the detection signal retained by the retention section reaches or surpasses a certain level.

Accordingly, it is possible to output an event signal properly. This also eliminates the need for the delay circuit that delays a reset timing until the level of the detection signal retained by the retention section reaches or surpasses a certain level.

Also, the image sensor as an embodiment includes an interruption section (output control section 20) that interrupts the output of a detection signal from the event detection section to the retention section in accordance with the level of the detection signal retained by the retention section (refer to FIG. 9).

This makes it possible to perform control that allows for proper output of an event signal including halting the output of a detection signal from the event detection section to the retention section in response to the fact that the level of the detection signal retained by the retention section reaches or surpasses a certain level and canceling the halting of the output of a detection signal to the retention section in response to the fact that the level of the detection signal retained by the retention section falls below a certain level.

Accordingly, it is possible to achieve improved precision for event detection.

Further, in the image sensor as an embodiment, the interruption section halts the output in response to the fact that the level of the detection signal retained by the retention section reaches or surpasses a certain level.

This makes it possible to prevent a new event detection signal that occurs before readout from being merged into a detection signal of an immediately previous event.

Accordingly, it is possible to output an event signal of a new event that occurs before readout as a different signal from an event signal of an event that occurred immediately previously, thus preventing an omission of event signal output. That is, it is possible to ensure improved accuracy in event signal output operation.

Still further, in the image sensor as an embodiment, the interruption section cancels the halting of the output in response to the fact that the level of the detection signal retained by the retention section falls below a certain level.

This permits input of the detection signal to the retention section in response to the fact that the level of the detection signal retained by the retention section falls below a certain level as a result of readout of a signal from the retention section, thus allowing for the retention section to retain a new event detection signal.

Accordingly, it is possible to output an event signal of a new event that occurs before readout as a different signal from an event signal of an event that occurred immediately previously, thus preventing an omission of event signal output. That is, it is possible to ensure improved accuracy in event signal output operation.

Also, in the image sensor as an embodiment, the interruption section includes switches (switches SWp and SWm) turned ON and OFF by an output signal of the retention section that is inserted in an output line of the detection signal from the event detection section to the retention section.

This ensures that the interruption section needs a minimum of only switches that are turned ON and OFF by an output signal of the retention signal as its components.

Accordingly, it is possible to provide a simpler configuration and a reduced circuit scale of the interruption section.

Also, in the image sensor as an embodiment, the retention section (25 or 25') counts and retains the number of times the detection signal is acquired by the event detection section as the number of event occurrences, and the readout section reads out the count value retained by the retention section as the event signal.

This makes it possible to output, as an event signal, a signal that indicates the number of event occurrences until readout even in the case of a long wait time from an event occurrence to readout.

Accordingly, it is possible to not only detect whether or not the amount of light received has changed but also estimate a variation in amount of light received.

Further, the image sensor as an embodiment includes the plurality of photoreception sections and an event detection section for each of the photoreception sections, and the reset section resets the reference signal level of the plurality of event detection sections with a common reset signal (refer to FIGS. 13 and 15).

This contributes to a reduced number of reset sections to be provided in realizing a reset of each of the event detection sections.

Accordingly, it is possible to reduce the circuit scale in realizing a reset of each of the event detection sections and miniaturize the image sensor.

Still further, in the image sensor as an embodiment, the four photoreception sections include a plurality of pixels arranged in a Bayer pattern, and the reset section is provided for each of the pixels.

This makes it possible to reduce, in the case where a pixel configuration is adopted that permits color image capture, the circuit scale as compared to the case where a reset section is provided for each event detection section while at the same time using an appropriate event detection unit as a pixel unit.

Therefore, it is possible to strike a balance between optimization of the event detection unit and circuit scale reduction for the image sensor capable of color image capture.

Also, a recording apparatus as an embodiment (imaging apparatus 100) includes the image sensor as the above embodiment and a recording section (recording section 102). The recording section records the event signal read out by the readout section of the image sensor.

Such a recording apparatus as an embodiment can also provide a similar action and advantageous effect to the image sensor as the embodiment described above.

Also, a reset method as an embodiment detects a change in an amount of light received as an event by finding a difference between a past photoreception signal level, i.e., a reference level, of a photoreception section that acquires an electric signal proportional to an amount of light received as a photoreception signal and a current photoreception signal level, receives input of a detection signal indicating the detection of an event and retains the detection signal, reads out the retained detection signal as an event signal, and resets the reference level to the current photoreception signal level of the photoreception section after the detection of an event and before the readout of an event signal.

Such a reset method as an embodiment can also provide a similar action and advantageous effect to the image sensor as the embodiment described above.

It should be noted that the advantageous effects described in the present specification are merely illustrative and not restrictive and that there may be other advantageous effects.

8. Present Technology

It should be noted that the present technology can also have the following configurations.

(1)

An image sensor including:

a photoreception section configured to acquire an electric signal proportional to an amount of light received as a photoreception signal;

an event detection section configured to detect a change in the amount of light received as an event by finding a difference between a past photoreception signal level, i.e., a reference level, and a current photoreception signal level;

a retention section configured to receive input of a detection signal indicating the detection of the event from the event detection section and retain the detection signal;

a readout section configured to read out the detection signal retained by the retention section as an event signal; and a reset section configured to reset the reference level to the current photoreception signal level of the photoreception section after the detection of the event by the event detection section and before the readout of the event signal by the readout section.

(2)

The image sensor according to (1), in which the reset section resets the reference level on the basis of the detection signal output from the event detection section.

(3)

The image sensor according to (2), in which the reset section resets the reference level on the basis of a signal obtained by delaying the detection signal.

(4)

The image sensor according to (1), in which the reset section resets the reference level on the basis of an output signal of the retention section.

(5)

The image sensor according to any one of (1) to (4), further including:

an interruption section configured to interrupt the output of a detection signal from the event detection section to the retention section in accordance with the level of the detection signal retained by the retention section.

(6)

The image sensor according to (5), in which the interruption section halts the output in response to the fact that the level of the detection signal retained by the retention section reaches or surpasses a certain level.

(7)

The image sensor according to (6), in which the interruption section cancels the halting of the output in response to the fact that the level of the detection signal retained by the retention section falls below a certain level.

(8)

The image sensor according to (7), in which the interruption section includes a switch turned ON and OFF by an output signal of the retention section that is inserted in an output line of the detection signal from the event detection section to the retention section.

(9)

The image sensor according to any one of (1) to (3), in which the retention section counts and retains the number of times the detection signal is acquired by the event detection section as the number of event occurrences, and the readout section reads out a count value retained by the retention section as the event signal.

(10)

The image sensor according to any one of (1) to (9), further including:

a plurality of the photoreception sections; and the event detection section for each of the photoreception sections, in which the reset section resets the reference signal level of a plurality of the event detection sections with a common reset signal.

(11)

The image sensor according to (10), in which the four photoreception sections include a plurality of pixels arranged in a Bayer pattern, and the reset section is provided for each of the pixels.

REFERENCE SIGNS LIST

1 Image sensor,
100 Imaging apparatus,
L1 Signal line,
12 Arbiter,
13 Readout section,
15, 15A, 15B Pixel,
16 Photoreception section,
17, 17' Event detection section,
18, 18A, 18', 25, 25' Retention section,
19, 19A, 19B, 19' Reset section,
Q1 to Q12 Transistor,
C1, C2 Capacitor,
SWr Reset switch,
Vop, Vom Output voltage,
Evnp, Evnm, Evnp', Evnm' Event signal,
20 Output control section,
20a OR gate circuit,
SWp, SWm Switch,
50 Controller,
55 Row driver,
56 Output circuit,

The invention claimed is:

1. An image sensor comprising:
a photoreception section configured to acquire an electric signal proportional to an amount of light received as a photoreception signal;
an event detection section configured to detect a change in the amount of light received as an event by finding a difference between a past photoreception signal level, i.e., a reference level, and a current photoreception signal level;
a retention section configured to receive input of a detection signal indicating the detection of the event from the event detection section and retain the detection signal;
a readout section configured to read out the detection signal retained by the retention section as an event signal; and
a reset section configured to reset the reference level to the current photoreception signal level of the photoreception section after the detection of the event by the event detection section and before the readout of the event signal by the readout section.

2. The image sensor according to claim 1, wherein
the reset section resets the reference level on a basis of the detection signal output from the event detection section.

3. The image sensor according to claim 2, wherein
the reset section resets the reference level on a basis of a signal obtained by delaying the detection signal.

4. The image sensor according to claim 1, wherein
the reset section resets the reference level on a basis of an output signal of the retention section.

5. The image sensor according to claim 1, further comprising:
an interruption section configured to interrupt the output of a detection signal from the event detection section to the retention section in accordance with the level of the detection signal retained by the retention section.

6. The image sensor according to claim 5, wherein
the interruption section halts the output in response to the fact that the level of the detection signal retained by the retention section reaches or surpasses a certain level.

7. The image sensor according to claim 6, wherein
the interruption section cancels the halting of the output in response to the fact that the level of the detection signal retained by the retention section falls below a certain level.

8. The image sensor according to claim 7, wherein
the interruption section includes a switch turned ON and OFF by an output signal of the retention section that is inserted in an output line of the detection signal from the event detection section to the retention section.

9. The image sensor according to claim 1, wherein
the retention section counts and retains the number of times the detection signal is acquired by the event detection section as the number of event occurrences, and
the readout section reads out a count value retained by the retention section as the event signal.

10. The image sensor according to claim 1, further comprising:
a plurality of the photoreception sections; and
the event detection section for each of the photoreception sections, wherein
the reset section resets the reference signal level of a plurality of the event detection sections with a common reset signal.

11. The image sensor according to claim 10, wherein
the four photoreception sections include a plurality of pixels arranged in a Bayer pattern, and
the reset section is provided for each of the pixels.

12. A recording apparatus comprising:
an image sensor, the image sensor including
a photoreception section configured to acquire an electric signal proportional to an amount of light received as a photoreception signal,
an event detection section configured to detect a change in the amount of light received as an event by finding a difference between a past photoreception signal level, i.e., a reference level, and a current photoreception signal level,
a retention section configured to receive input of a detection signal indicating the detection of the event from the event detection section and retain the detection signal, a readout section configured to read out the detection signal retained by the retention section as an event signal, and a reset section configured to reset the reference level to the current photoreception signal level of the photoreception section after the detection of the event by the event detection section and before the readout of the event signal by the readout section; and a recording section configured to record the event signal read out by the readout section.

13. A reset method comprising:

detecting a change in an amount of light received as an event by finding a difference between a past photoreception signal level, i.e., a reference level, of a photoreception section that acquires an electric signal proportional to an amount of light received as a photoreception signal, and a current photoreception signal level;

receiving input of a detection signal indicating the detection of the event and retaining the detection signal, and reading out the retained detection signal as an event signal; and resetting the reference level to the current photoreception signal level of the photoreception section after the detection of the event and before the readout of the event signal.

* * * * *